(12) United States Patent
Mannava et al.

(10) Patent No.: US 8,886,571 B2
(45) Date of Patent: Nov. 11, 2014

(54) SYSTEM AND METHOD FOR SERVICE VIRTUALIZATION IN A SERVICE GOVERNANCE FRAMEWORK

(75) Inventors: Ravi Mannava, Torrance, CA (US);
Alex V. Maclinovsky, Glenview, IL (US); Alexey Yakubovich, Buffalo Grove, IL (US); Michael S. Jenkins, Jr., Keller, TX (US)

(73) Assignee: Oracle America, Inc., Redwood City, CA (US)

( * ) Notice: Subject to any disclaimer, the term of this patent is extended or adjusted under 35 U.S.C. 154(b) by 1757 days.

(21) Appl. No.: 12/194,393

(22) Filed: Aug. 19, 2008

(65) Prior Publication Data

US 2010/0049628 A1 Feb. 25, 2010

(51) Int. Cl.
*G06F 17/00* (2006.01)
*G06Q 30/06* (2012.01)
*G06Q 10/10* (2012.01)
*G06Q 30/02* (2012.01)

(52) U.S. Cl.
CPC ............ *G06Q 10/10* (2013.01); *G06Q 30/0601* (2013.01); *G06Q 30/0283* (2013.01)
USPC ............................ 705/400; 705/418; 718/100

(58) Field of Classification Search
USPC .......................................... 705/400; 718/100
See application file for complete search history.

(56) References Cited

U.S. PATENT DOCUMENTS

| | | | |
|---|---|---|---|
| 6,983,371 B1 * | 1/2006 | Hurtado et al. ............... | 713/189 |
| 2002/0112171 A1 * | 8/2002 | Ginter et al. ................... | 713/185 |
| 2004/0148183 A1 * | 7/2004 | Sadiq ................................ | 705/1 |
| 2005/0008163 A1 * | 1/2005 | Leser et al. .................... | 380/281 |
| 2008/0098453 A1 | 4/2008 | Hinton et al. | |
| 2009/0064087 A1 | 3/2009 | Isom | |
| 2009/0198534 A1 | 8/2009 | Brown et al. | |
| 2009/0299920 A1 * | 12/2009 | Ferris et al. .................... | 705/418 |

OTHER PUBLICATIONS

T. G. J. Schepers, M. E. Iacob, and P. A. T. Van Eck. 2008. A lifecycle approach to SOA governance. In Proceedings of the 2008 ACM symposium on Applied computing (SAC '08). ACM, New York, NY, USA, pp. 1055-1061.
M. Muriankara, "SOA governance framework and solution architecture", IBM, May 15, 2008, 11 pages.
M. Afshar, "SOA Governance: Framework and Best Practices, Version 1.1", Oracle, May 2007, 22 pages.
W. A. Brown, G. Moore, and W. Tegan, "SOA Governance—IBM's Approach", IBM, Aug. 2006, 16 pages.

* cited by examiner

*Primary Examiner* — Tsan-Yu J Huang
(74) *Attorney, Agent, or Firm* — Robert C. Kowert; Meyertons, Hood, Kivlin, Kowert & Goetzel, P.C.

(57) ABSTRACT

A service governance framework may provide a platform for development and hosting of virtual service offerings and generation of interfaces to operations thereof, dependent on configurable functional parameters and/or non-functional aspects associated therewith. Virtualization techniques may be applied at an endpoint level, binding level, message level, operation level, and/or service level at design time, and supported with corresponding changes at runtime. Users having various roles may access the framework to specify operations of services provided by computing service sources to include in a virtual service offering, specify configuration parameter values associated with them, and/or specify a contract of non-functional aspect clauses for the virtual service offering. The framework may produce the interface by modifying an interface provided by the computing service sources (e.g., a WSDL). The framework may include aspect enforcement methods and an underlying common information model, and may support versioning and life cycles of service offerings and/or components.

20 Claims, 22 Drawing Sheets

| HOME | VERSION | | | | | LOGOUT |

Service Governance Framework Admin Console

| Business Analyst | Governance Officer | SOA Developer |

Create a Service Component
Fields marked with an asterisk * are required.

- Aspect Methods
- Failure Methods
- Search

Service Components
- Service Versions

*Name <u>1101</u>    [Shipping Rate Calculator]
*Version <u>1102</u>  [1.0.0.0]
Is Default Version <u>1103</u>  ☑

[Save] [Cancel]

Operations list <u>1104</u>
[New] [DELETE]

| Operation Name | Idempotent | Synchronous | Transactionality | Method | Undo Operation |

No Operation(s) found. Click "New..." above to add a Operation(s).

[Save] [Cancel]

FIG. 11

Service Governance Framework Admin Console

Add Operations
Fields marked with an asterisk * are required.
● Web Service A  ● Web Service B  ● Others

*WSDL URL selection 1202  | http://service.shipco.com/shipping/shipco.asmx?V | source selection 1201

[ Get Operations ]

Operations list 1203

| | Operation Name | Idempotent | Synchronous | Transactionality | Method |
|---|---|---|---|---|---|
| ☑ | GetShipRate | false | false | false | GetShipRate:Shipco_ServiceSoap |
| ☐ | GetExtendedShipRate | | | | GetExtendedShipRate:Shipco_ServiceSoap |

[ Select ] [ Cancel ]

Service Governance Framework Admin Console

Edit Operation
*Fields marked with an asterisk * are required.*
Operation

*Operation Name 1301    [GetShipRate]
Idempotent 1302         ☐
Synchronous 1303        ☐
Transactionality 1304   ☐
Undo Operation 1305     [None ▼]

*Method Name 1306   [GetShipRate:Shipco]
Action 1307         [http://service.shipco]
*URI 1308           [http://service.shipco]
Monitorable 1309    ☑
Manageable 1310     ☐
Binding Type 1311   [HTTP]

Properties list 1312

| Name | Value |
|------|-------|

*No properties found. Click "Add property" above to add a property.*

Required Headers list 1313

[New] [Delete]

| Element Reference | Use Inbound | Use Outbound | Use Fault |
|-------------------|-------------|--------------|-----------|

*No SGF Header found. Click "New..." above to add a SGF Header.*

[Save] [Cancel]

| HOME | VERSION | | | | | | LOGOUT |
|---|---|---|---|---|---|---|---|

Service Governance Framework Admin Console

| Business Analyst | Governance Officer | SOA Developer |
|---|---|---|

Create a Service Component
Fields marked with an asterisk * are required.

◎ Aspect Methods
◎ Failure Methods
🔍 Search

*Name 1401    [Shipping Rate Calculator]
*Version 1402    [1.0.0.0]
Is Default Version 1403 ☐

[Save] [Cancel]

Service Components

◈ Service Versions

Operations list 1404
[New] [DELETE]

| ☑ | Operation Name | Idempotent | Synchronous | Transactionality | Method | Undo Operation |
|---|---|---|---|---|---|---|
| ☐ | GetShipRate | false | false | false | GetShipRate:Shipco_Service | None ▾ |

[Save] [Cancel]

FIG. 14

Service Governance Framework Admin Console

Add Operations
Fields marked with an asterisk * are required.
● Web Service A  ● Web Service B  ○ WSDL URL  ● Others    source selection *1501*

*WSDL URL *1502*  | http://webservco.com/UserMngr/UserMngrSOA |  [Get Operations]

**Operations list *1503***

| ☑ 🔳 | Operation Name | Idempotent | Synchronous | Transactionality | Method |
|---|---|---|---|---|---|
| ☐ | AddUser | false | false | false | AddUser:UserMngrSOAP |
| ☐ | DeleteUser | false | false | false | DeleteUser:UserMngrSOAP |
| ☑ | GetUserInfo | false | false | false | GetUserInfo:UserMngrSOAP |
| ☐ | UpdateUserInfo | false | false | false | UpdateUserInfo:UserMngrSOAP |
| ☑ | ListUsers | false | false | false | ListUsers:UserMngrSOAP |

[Select] [Cancel]

*FIG. 15*

Service Governance Framework Admin Console

[HOME] [VERSION]                                                           LOGOUT

| Business Analyst | Governance Officer | SOA Developer |

Create a Service Component
Fields marked with an asterisk * are required.

*Name 1601      [Shipping Rate Calculator]
*Version 1602   [1.0.0.0]
Is Default Version 1603  ☑

[Save] [Cancel]

- Aspect Methods
- Failure Methods
- Search
- Service Components
- Service Versions

Operations list 1604
[New] [DELETE]

| ☑ | Operation Name | Idempotent | Synchronous | Transactionality | Method | Undo Operation |
|---|---|---|---|---|---|---|
| ☐ | GetShipRate | false | false | false | GetShipRate:Shipco_Service | None |
| ☐ | GetUserInfo | false | false | false | GetUserInfo:UserMngrSOAP | None |
| ☐ | ListUsers | false | false | false | ListUsers:UserMngrSOAP | None |

[Save] [Cancel]

| HOME | VERSION | | | LOGOUT |
|---|---|---|---|---|

Service Governance Framework Admin Console

| Business Analyst | Governance Officer | SOA Developer |
|---|---|---|

Create a Governance Contract

Fields marked with an asterisk * are required.

- Aspect Groups
- Binding Types
- Governance Aspects

*Name <u>1801</u>  [LeaseEnforced]

[Save] [Cancel]

- Governance Contracts

Clause list <u>1802</u>

[New] [ DELETE ]

| ☑ ⊞ | Aspect Name | Aspect Group | Enforcement Level | Value | Ordering |
|---|---|---|---|---|---|
| ☐ | LeaseEnforced | Availability | ENFORCED | | [Move Up] [Move Down] |

- Search
- Value Types

[Save] [Cancel]

Service Governance Framework Admin Console

HOME | VERSION | LOGOUT

Business Analyst | Governance Officer | SOA Developer

- End Points
- Management
- Search
- ◆ Service Offerings

Create a Service Offering
Fields marked with an asterisk * are required.

*Name 1901 [Shipping_with_Lease]

Lease
Effective Date 06/14/2007
Expiration Date 06/14/2008
[Extend Lease] 1902

Components
*Service Component  Shipping Rate Calculator 1903
*Governance Contract  LeaseEnforced 1904

[Save] [Cancel]

*Endpoint list 1905
[Add] Remove
| | Deployment Server | Binding Type | |
|---|---|---|---|
| ☑ ■ | localhost | SOAP OVER HTTP | [Select] |
| □ | | | [Select] |

Attributes list 1906
[New] DELETE
| Name | Value |
|---|---|
No Attribute found. Click "New..." above to add a Attribute.

[Save] [Cancel]

| HOME | VERSION | | | | | | | | LOGOUT |
|---|---|---|---|---|---|---|---|---|---|
| Service Governance Framework Admin Console | | | | | | | | | |
| Business Analyst | Governance Officer | SOA Developer | Service Offerings | | | | | | |
| | | | Service Offerings list <u>2001</u> | | | | | | |
| ⇄ End Points | | | New Delete | | | | | | |
| ⚙ Management | | | ☑ ☰ | ID ▼ | Name | Service Component | Governance Cont | Effective Date | Expiration Date | Re-Publish |
| 🔍 Search | | | ☐ | 1086 | OfferingA_LeaseRep | OfferingA | LeaseReported | 2007-06-29 | 2008-06-07 | Re-Publish |
| ◇ Service Offerings | | | ☐ | 1020 | OfferingA_NoContract | OfferingA | EmptyContract | 2007-06-29 | 2008-06-07 | Re-Publish |
| | | | ☐ | 1110 | Shipping_with_Lease | Shipping Rate Calc | LeaseEnforced | Thu Jun 14 00:00:00 EDT 2 | Sat Jun 14 00:0 EDT 2008 | Re-Publish |
| | | | ☐ | 1030 | temp | OfferingA | EmptyContract | Thu Jun 14 00:00:00 EDT 2 | Sat Jun 14 00:0 EDT 2008 | Re-Publish |

*FIG. 20*

| HOME | VERSION | | | | | | | LOGOUT |
|---|---|---|---|---|---|---|---|---|

Service Governance Framework Admin Console

| Business Analyst | Governance Officer | SOA Developer |
|---|---|---|

Management

Manageable Resources list 2101

| Manageable Resource Type | Service Offering ▼ | ☐ INITIATED ☐ PENDING ☐ REJECTED ☐ ACTIVE ☐ INACTIVE |
|---|---|---|

⇄ End Points

▣ Management

🔍 Search

◇ Service Offerings

| ID | Name | Type | State | Select |
|---|---|---|---|---|
| 1086 | OfferingA_Lease | com.myco.sgf.registry | ☐ | Select ▼ |
| 1020 | OfferingA_NoContract | com.myco.sgf.registry | ☐ | Select ▼ |
| 1110 | Shipping_with_Lease | com.myco.sgf.registry | ☐ | Select ▼ |
| 1030 | temp | com.myco.sgf.registry | ☐ | Select / INITIATED / PENDING ▼ |
| 1050 | GetWeather_Empty | com.myco.sgf.registry | ☐ | ACTIVE |
| 1093 | GetWeather_Lease | com.myco.sgf.registry | ☐ | INACTIVE |
| 1070 | OfferingA_Lease | com.myco.sgf.registry | ☐ | Select ▼ |

Update

*FIG. 21*

SYSTEM AND METHOD FOR SERVICE VIRTUALIZATION IN A SERVICE GOVERNANCE FRAMEWORK

BACKGROUND OF THE INVENTION

1. Field of the Invention

This invention relates generally to shared computing services, and more particularly to systems and methods for developing, providing, managing, and consuming virtual services through a service governance framework.

2. Description of the Related Art

Today, web services are the preferred standards-based way to realize Service Oriented Architecture (SOA). A web service is typically composed of a number of related operations. Each operation is designed for a different purpose and serves a different kind of request, such as creating or deleting a customer. An operation is typically a single unit of functionality that processes a particular kind of request from a service consumer. The requirements for and usage of the same service can change from consumer to consumer depending on the consumer's role, on the consumer's usage scenario, or on security issues, making it difficult, if not impossible, for consumers to use the service "as is." Therefore, in typical systems, a separate web service is created for each group of users based on their requirements. This complicates the implementation of the services and contradicts a key principle of SOA, service reuse. Furthermore, as the number of consumers and service consumption scenarios in an organization grows, so does the need for separate services. This can make an SOA ecosystem very complex and difficult to manage.

In addition, in many cases organizations have to rely on services exposed out of packaged, legacy, and/or external systems that are known to expose service interfaces with a variety of imperfections, such as:

Missing operations that are required by the consumers

Exposure of irrelevant, implementation-specific or "back-door" operations that should not be exposed to outside parties Scattering of logically related operations across a number of disparate services Providing inappropriate, misleading, or irrelevant names for services and/or operations In early SOA platforms, there was an assumption that a developer of new functionality (e.g. a business application) maintains control over all of the important parts of the application. However, this is no longer always true. In the past, the developers maintained control over the producers and consumers of specific capabilities either by defining them directly or by virtue of making choices to use (or not to use) certain versions of certain third-party libraries as part of their solutions. Once these choices were made and their suitability was verified, the developer could rely on everything remaining the same at least until the next development cycle. This may also no longer be the case for post-pilot SOA implementations. Instead, different components of composite applications may exist in different organizations, business units, and countries. In some cases, services are exposed from black box implementations. In addition, both service producers and consumers might undergo changes independently of each other, evolving, moving, merging, splitting and even disappearing completely. To overcome some of these issues, various service virtualization techniques have been developed.

In general, service virtualization represents decoupling of the service interface presented to consumers of the service from the actual interface exposed by the service implementation. There are different forms of virtualization, each of which allows some level of reuse of existing services and each of which may also be used in conjunction with governance solutions. Existing governance solutions, e.g., gateway-based governance solutions, typically take a very narrow view of service virtualization, and are usually limited to endpoint and/or binding level virtualization. For example, such gateways typically sit between the service implementation of a governed service and the service consumers, and force the latter to redirect their requests to the virtual endpoints exposed by the gateway instead. The gateways listen on those virtual endpoints, validate, monitor, and enforce governance policies on the service requests (from service consumers) and on the responses (from the service implementation). This is generally referred to as endpoint virtualization.

SUMMARY

Systems and methods for providing virtual service offerings are disclosed. The systems and methods described herein may in some embodiments operate to provide a service governance framework for development and hosting of virtual service offerings, and for generation of interfaces to operations of virtual service offerings dependent on configurable functional parameters and/or non-functional aspects associated therewith. Virtualization techniques may in different embodiments be applied at design time at any or all of a variety of levels, including the endpoint level, the binding level, the message level, the operation level, and the service level, as described herein. Corresponding changes in the behavior of virtualized services may be performed automatically at runtime.

Users, including business analysts, virtual service developers (e.g., SOA developers), and governance officers, may access the service governance framework through an administrative console (e.g., though a graphical user interface), and may specify or select operations of one or more services provided by a variety of computing service sources to be included in a virtual service offering. In some embodiments, not all of the operations of a given source service may be included in the virtual service offering. The users may access the framework to select and/or modify configuration parameter values associated with the service offering or an operation thereof, such as an operation name, a method name, an action, a computing services source, a monitorable property, a manageable property, a binding type, an endpoint, a version identifier, and/or an undo operation. The framework may produce an interface to the operations of the virtual service offering dependent on the configuration parameter values. In some embodiments, the interface may be generated by modifying an interface (e.g., a WSDL) provided by the computing service source. The ability to specify and/or modify the configuration parameters (and to modify the interface to and/or behavior of the selected operations) may provide virtualization of the service offering at one or more of the virtualization levels supported by the framework, e.g., at the endpoint level, the binding level, the message level, or the operation level, in different embodiments.

A user of the service governance framework (e.g., a business analyst or governance officer) may in some embodiments access the framework (e.g., though a graphical user interface) to define or select a contract to be associated with the virtual service offering. This contract may include one or more clauses specifying non-functional aspects of the service offering and associated aspect values. These aspects may in different embodiments define, for example, a security feature, a throttling feature, a monitoring feature, a reporting feature, a lease enforcement feature, a service chargeback feature, a version enforcement feature, a message routing feature, and/or a message translation feature. Various aspect enforcement methods may be provided by the framework to implement these features transparently to service consumers. The service governance framework may in some embodiments include an underlying information model, in which operation metadata, configuration parameter values, contract information, aspect enforcement methods, or other components of the system may be associated with virtual service offerings provided through the framework. Unlike service specifications and corresponding information models developed for previous systems (i.e., systems that do not support the concepts of governance and virtualization described herein), this underlying information model may be particularly well suited for creating and communicating service virtualization capabilities.

Various users of the service governance framework (e.g., dependent on their role) may in some embodiments access the framework to initiate exposure and/or activation of the interface for the virtual service offering, which may be further dependent on the life cycle state of the virtual service offering and/or a version thereof. Consumers of the virtual service offering may access the framework to request a service, e.g., one of the operations of the virtual service offering. The service governance framework may execute the underlying service implementation to perform the operation on behalf of the service consumer, modifying its behavior according to functional parameters and/or non-functional aspects associated with the operation, and may return results to the service consumer. The bindings and/or transport protocols through which service consumers access the operations of the virtual service offering may be different from those of the underlying service implementations, and messages may be translated between the framework, consumers, and service implementations by various methods provided in the framework.

The methods described herein may, in some embodiments, be implemented by program instructions stored in a memory coupled to one or more processors in a computing system, (e.g., by program instructions stored on a computer-readable storage medium and executable by the one or more processors in the computing system). The program instructions may be included in the same memory as one in which metadata, configuration parameter values and/or contracts associated with source service components, virtual service components and/or virtual service offerings are stored (e.g., according to an underlying information model for the service governance framework), or in a different memory, in different embodiments.

BRIEF DESCRIPTION OF THE DRAWINGS

FIGS. 11-21 depict representations of graphical user interface (GUI) screens of a service governance framework console, according to one or more embodiments.

Figure 1:
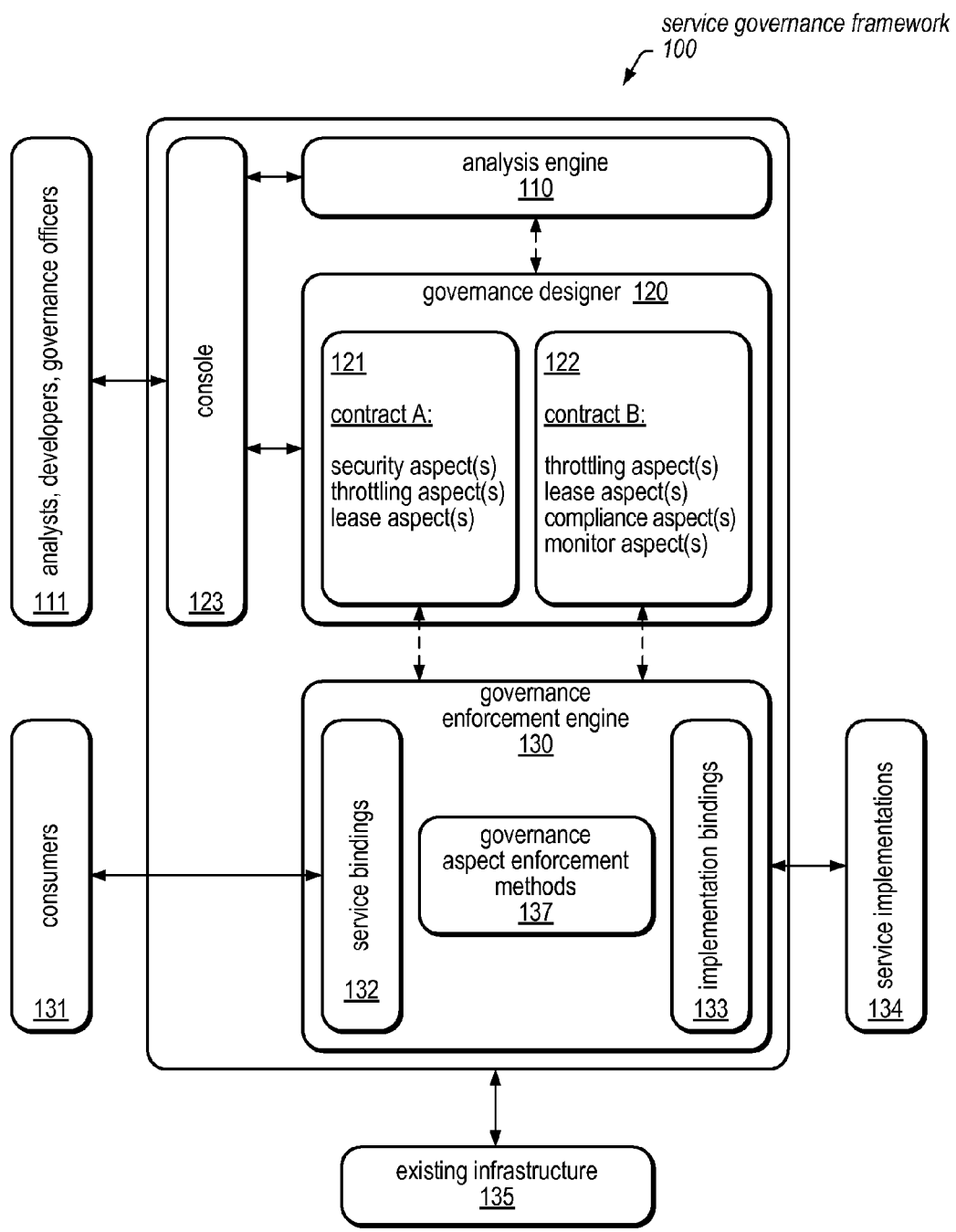
FIG. 1 is a block diagram illustrating a conceptual model of a framework for development and deployment of virtualized enterprise services, according to one or more embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and methods for providing a coordinated, layered approach to service virtualization within a service governance framework are disclosed. Various embodiments of these service virtualization techniques may facilitate the separation between the way SOA services are designed, implemented, and exposed, and the way those services are consumed. By introducing a mediation layer between the two concerns, a variety of capabilities may be enabled in the resolution, execution, and management of service platforms. In contrast with previous SOA platforms, in some embodiments the systems and methods described herein may not rely on the assumption that a developer of new functionality (e.g., a business application) maintains control over all the important parts of his solution.

As described above, service virtualization generally represents decoupling of the service interface presented to the consumer(s) from the actual interface exposed by the service implementation. This decoupling can be achieved at different levels and/or on multiple levels, in various embodiments. A coordinated layered approach, as described herein, may allow higher levels of virtualization to build on lower ones. In various embodiments, the following levels of virtualization may be appropriate in the context of web services:

Endpoint Level
Binding Level
Message Level
Operation Level
Service Level

Many of the descriptions of service virtualization included herein are presented in the context of web services. In these examples, interfaces may be service definitions implemented in the Web Services Description Language, an XML format for describing network services (i.e., they may be implemented as WSDLs). In various embodiments, each of the levels of virtualization described herein may involve, in addition to supporting functionality in the framework itself, some form of advanced WSDL transformation.

As used herein, the term "enterprise service" may refer to a self-contained component delivering business functionality which responds to requests through a well-defined, standard, published interface, combined with an extendible set of non-functional, policy-driven aspects (i.e. security, lease, versioning, etc.). In various embodiments, such enterprise services may include one or more service components, each of which may include one or more individual operations, as described in more detail herein. As used herein, the term "service offering" may refer to an enterprise service that is available for use by service consumers, i.e., one that has been developed, configured, exposed to consumers through an interface, and activated for execution in an SOA architecture. In various embodiments, the operations available in an enterprise service may not be provided by a single service provider, but may be a virtual service offering, provided through a service governance framework, as described herein.

A virtual service component may provide the functional core of a service offering. In various embodiments, new and/or legacy code implementing operations of a virtual service component may be implemented in any technology and may be exposed through any defined and supported protocol, such as Java™ (POJO, EJB, JMS), various Web Service protocols, (SOAP/HTTP), and/or other standard or custom protocols, which may be added to the framework. Therefore, service developers may concentrate on functionality, while the framework handles communications. In some embodiments, service components may have multiple versions, two or more of which may be active at a given time. They may also support refinement methods, as described in more detail herein, and may perform request routing.

In various embodiments, a service governance framework may support service component virtualization by allowing the developer to select methods to implement operations and/or to enforce non-functional governance aspects, to change interfaces to and/or names of underlying service implementations, and/or to combine operations of multiple service sources into a virtual service component. In some embodiments, virtual service components may be environment-aware. In other words, they may behave differently, as appropriate, in various software development life cycle (SDLC) environments and in different SDLC phases, as described in more detail herein.

Unlike current SOA governance offerings, the service governance framework described herein may in various embodiments provide service virtualization at any or all of the levels described above, e.g., in various combinations. In addition, the service governance framework may support multiple use cases that allow SOA adopters to effectively reuse service implementations while taking into account different requirements of consumers, e.g., depending on their role, consumption scenario, or security restrictions. The service governance framework may provide a virtual view of services to consumers based on such requirements.

The service governance framework described herein may in various embodiments provide a broad and systematic set of service virtualization techniques and capabilities, which provides a five-level virtualization hierarchy. This framework may facilitate effective and responsible reuse of various service implementations in different operations environments, business contexts, and service consumption scenarios. For example, service level virtualization techniques may allow a consumer to have all related operations under one service offering instead of having to subscribe to different services. Operation level virtualization may allow a consumer to have more meaningful and business-relevant operation names in the service. Binding level virtualization may allow a consumer to use their supported and/or preferred transport mechanisms and protocols to invoke a service. Message level virtualization may allow a consumer to add or remove systemic qualities, such as security, versioning, etc., to governed services. As a result of these advanced virtualization techniques, a governed service may be reused more effectively, which is a key principle of SOA.

Unlike existing SOA and/or governance solutions that are limited by the need to conform to the original service WSDLs of its underlying components, the service governance framework described herein may in some embodiments couple service virtualization with sophisticated WSLD processing. In such embodiments, each virtualization level may be mapped onto a set of WSDL transformations that are used to create consumer-side WSDLs that reflect the features and properties of virtualized services. The five levels of virtualization, along with their capabilities and use cases, are described in more detail below.

Endpoint Level Virtualization

In order to manage the proliferation of services in a true SOA environment, a service governance framework may in some embodiments allow for the transparent resolution of service implementations without the need for a service developer to code all possible endpoint invocations. In such embodiments, endpoint virtualization may be used to expose services to service consumers at a different logical endpoint than the one to which the service implementation is actually bound. Endpoint virtualization may in various embodiments serve a number of purposes, including: hiding the service implementation being invoked from consumers, facilitating location transparency, enabling high availability and load balancing, and making it easier to transition composite applications between different SDLC environments. Endpoint virtualization may in some embodiments be a requirement of a run-time policy enforcement engines implemented as a gateway and/or interceptors. This virtualization technique may allow a different service implementation to be invoked from any service call depending upon several factors. For example, a virtualized credit approval service may invoke different service implementations depending on the promised response period (e.g., as defined by a service level agreement), the type of user, or the time of day the request is made.

In various embodiments, a service governance framework may support endpoint virtualization techniques that meet some or all of the following requirements:
1. Provides the ability to assign an arbitrary external facing endpoint as the access point to a virtualized service implementation
2. Provides a concrete binding to a service consumer through which the service request can be processed
3. Does not require the service implementation to be aware of the virtual endpoint 4. Provides routing between the external endpoint and the actual service implementation endpoint
5. Does not reveal the internal location of the service implementation's internal endpoint
6. Does not introduce dependencies or force changes to the internal service implementation Binding Level Virtualization A typical client request to call a web service is tied to the specific transport and protocol agreed upon between the service requester and the service provider as defined in the interface specification (e.g., the WSDL). Binding virtualization (sometimes referred to as "transport virtualization") may enable decoupling of the protocols and transport mechanisms used in service implementation from those that are made available to the consumers. In various embodiments, this may involve mediation between different versions of the same protocol (e.g. SOAP 1.1 and SOAP 1.2), different protocols (e.g. SOAP versus HTTP/REST) or different transport mechanisms (e.g. HTTP versus JMS versus SMTP, etc). In typical enterprise-wide SOA implementations, there is a common requirement to have the same service available over a number of different binding types to support different consumer demographics. However, it may not be practical or possible for a service implementer to be aware (at design time) of all of the possible permutations that may eventually be required when the service is exposed to consumers. Therefore, the service governance framework described herein may be implemented so that it is ubiquitous, yet binding-aware. In other words, in various embodiments, each governed service may be made available on all supported bindings. In such embodiments, the system may be aware of the binding through which each request arrived and may apply binding-specific policies to the requests, such as additional security restrictions for unsecured transports.

In various embodiments, a service governance framework may support binding virtualization techniques that meet some or all of the following requirements:
1. Allows service implementations to be decoupled from the transport used by a service call (request).
2. Allows any supported transport to be used to invoke any service implementation as defined by the framework
3. Allows the ability to translate between defined protocol versions
4. Allows the ability to translate between defined protocol types
5. Supports the definition of combinations of transports and protocols that may be associated with each service implementation
6. Allows the addition of systemic qualities, such as security, regardless of the capabilities of the underlying service implementation.

Message Level Virtualization

The first two types of virtualization described above may be used to alter how messages are delivered between the service consumer and provider. Message level virtualization, however, may in some embodiments affect message structure and/or content. This level of virtualization may be useful for adding or removing systemic qualities and contextual information, such as security or versioning information, to the messages of governed services, since some of the policies that govern systemic qualities require additional information to be passed with the message. In some cases, this level of virtualization may be used to modify message headers by adding, transforming, or removing them, according to a contract or other specification, or to include custom-defined headers. In other cases, it may be used to modify a message body, e.g., by adding message content (also known as "message enrichment"), hiding message content, encrypting or decrypting various elements of a message's content, and/or transforming message content from one XSD schema to another. For example, a security policy may require the use of a security header containing SAML or user name tokens, a version enforcement policy may require service version information to route requests to the appropriate version of the service, a Quality of Service (QoS) policy may require additional information to address specific QoS aspects, and a web services policy (e.g., an industry standard policy for web services) may require various elements for addressing, transactions, etc. A common way to get this information from a service consumer is through SOAP Header elements. However, in typical SOA systems, the service definition itself may not include these elements, as they may only be required by the middle layer (e.g., a gateway) that enforces these policies. Hence, the service consumer may have no idea what policies are enforced on the service and what information is required to be included in a service request. Message level virtualization may in some embodiments facilitate the inclusion of such information in the messages exchanged between service consumers and service providers, further decoupling service consumers and providers by controlling the addition and removal of the contextual information (e.g., in the form of SOAP headers).

In various embodiments, a service governance framework may support message level virtualization techniques that meet some or all of the following requirements:
1. Does not affect the underlying service implementation's ability to process the message as defined in the implementation's WSDL
2. Results in a message that is functionally equivalent to the original service implementation's WSDL
3. The WSDL exposed to the service consumer defines all of the requested contextual information that will allow an automated tool capable of invoking the original service correctly to be able to consume the virtualized service as well
4. Affects the request, response or both. For example, the virtualization engine may in some embodiments preserve state (e.g., encryption keys or tokens) between a request and a corresponding response.
5. Rather than implementing message level virtualization for every operation of every service from scratch, composes message level virtualization from a small number of reusable virtualization primitives.

Operation Level Virtualization

Operation level virtualization may be appropriate in various situations, two of which are described herein. One involves embodiments in which users compose operations from different services (i.e., from different sources and/or service providers) into a single virtual service component or service offering (as described below with respect to service level virtualization). In such embodiments, there may be a chance that this service component or offering may contain operations with the same name, resulting in a virtual service component or offering with duplicate operation names.

For example if account and order processing services are combined into a single virtual service offering, the following operations may be involved:
From an order processing service: send, view, edit, cancel
From an account management service: view, updateAddress, updateMailingAddress, updateCardInfo, updateSpecialDiscount In a new virtual account and order service without operation level virtualization: send, view, edit, view, updateAddress, updateMaillingAddress, updateCardInfo In a new virtual account and order service with operation level virtualization: send, viewOrder, edit, viewAccount, updateAddress, updateMaillingAddress, updateCardInfo By looking at the first version of the virtual account and order service, a consumer may have no idea which "view" operation may be used to view order details and which one may be used to view account details. Operation level virtualization may in some embodiments be used to resolve this ambiguity by renaming one or more operations in the virtual service.

The operation level virtualization technique may also be appropriate in situations in which the naming conventions of a service consumer and a service developer are out of synch, i.e., when an operation name which makes sense to the developer makes no sense to the service consumer. In some embodiments, an operation level virtualization technique may be used to rename the operations in the virtual service instead of renaming them in actual service. This may be more efficient than making changes in the actual service, which may require an additional development and testing cycle. For example, a product search service may include the following operations:

getProdByLoc—get list of products by location
getProdByCat—get list of products by category This service may initially be designed for internal use by a service developer, but later may be exposed to consumers (e.g., customers). The names of these operations, getProdByLoc and getProdbyCat, may make no sense to the consumers. Therefore, operation level virtualization may be used to expose a virtual service to the customers by renaming the operation so that they have more meaningful operation names as follows:

getProdByLoc may be renamed as getProductsByLocation
getProdbyCat may be renamed as getProductsByCategory Note that in order to fully support operation level virtualization it may not be enough to simply rename the corresponding elements in the client-side (e.g., consumer-facing) WSDL at design time. Similarly to the other virtualization techniques described in this document, in some embodiments there may also be a need for the run-time solution (e.g., a gateway) to use the information captured at design time to transform the requests and responses. For example, in the case of RPC/literal or RPC/encoded style services, the top level SOAP body element of the request and response may need to be transformed to match the original and virtualized service WSDLs.

In various embodiments, a service governance framework may support operation level virtualization techniques that meet some or all of the following requirements:

1. Supports definition of an arbitrary alias to a service operation which can be exposed through the consumer-facing WSDL
2. Does not expose the original service operation name to the service consumer
3. Renaming a service operation in a consumer facing WSDL has no effect on the underlying service implementation
4. Does not require a particular form or format that renamed operations have in relation to the original name
5. Does not allow a consumer to invoke a renamed service operation using its original name Service Level Virtualization In some cases, a service offering or service component cannot or should not be exposed to consumers in its entirety. This could be due to a number of reasons, including security considerations, the granularity of operations, or the overall cohesion of the service interface. In some embodiments, service level virtualization techniques may address these issues by exposing the virtual service interface/definition to the service consumers with only limited set of operations in which consumers may be interested in and/or which they are authorized to use. For example an insurance company may use a customer relationship management (CRM) package that exposes a web service. The service may include three operations: create, update and assignRating. The first two operations may be implemented according to standard semantics. The last operation ("assignRating") may allow a user to assign a value to a customer, which may be used to determine the commission of the agent who signed up the customer. When this service is exposed to agents themselves, service level virtualization may be used to suppress the assignRating operation to avoid potential abuse and conflict of interest issues.

In some cases, a service implementation may lack some necessary operations or a set of logically related operations may be scattered across a number of disparate services. In some embodiments, service level virtualization may be used to define and expose to consumers a cohesive and complete service even when individual service implementations lack those qualities. For example, the customer service described in the above example lacks a "delete" operation, which may lead to serious support issues once the service is exposed to thousands of field agents who typically lack technical aptitude and often use unreliable wireless connections. The CRM vendor may have failed to expose this operation on purpose, i.e., they may have considered customers too valuable to be deleted easily. In this example, service level virtualization may be used to create a workaround in the form of a stored procedure in the CRM data store. Using service level virtualization in combination with binding virtualization, the fact that a delete operation is implemented in a different system using a different technology may be hidden from consumers. In this example, a logically complete version of the customer service that includes all necessary operations (including "delete") and lacks any undesirable "back doors" may be exposed to agents, even though the original CRM package did not expose all of these operations.

In various embodiments, a service governance framework may support service level virtualization techniques that meet some or all of the following requirements:

1. Provides the ability to hide operations from public-facing WSDLs in order to hide the operations from consumers
2. Does not affect the ability of an underlying service implementation to locally call an otherwise hidden operation
3. Translates service requests to the form specified by an underlying service implementation's WSDL
4. Transforms a service reply back into the expected reply format as specified in the consumer facing WSDL
5. Does not provide access by service consumers to service operations designated as hidden As previously noted, in various embodiments, it may be necessary to concurrent support multiple versions of a service in a single environment. In some embodiments, these different versions may all need to be executed independently and/or for an extended and/or overlapping period of time. There may be different conditions that dictate which version of a service is invoked for a given service consumer or for a given service request. Therefore, in some embodiments, the service governance framework described herein may support the distinct versioning of services without forcing service consumers to distinguish between versions. At the same time, the service governance framework may allow a service consumer that wishes to invoke a specific version to be able to do so.

In various embodiments, a service governance framework may support versioning techniques that meet some or all of the following requirements:
1. Allows providers to publish and consumers to use multiple versions of the same service at the same time
2. Makes different versions clearly identifiable as versions of the same service
3. Supports designation of the default version of a service, which may be invoked if no specific version is requested. Note that a default version may not be required to be the latest (i.e., the most recently developed) version.
4. Supports designation of compatibility relationships between service versions. For example, "Version A is compatible to version B" may indicate that version A can process requests intended for version B and return responses that the client of B will understand. In other words, it may be safe to route to A requests that were intended for B.
5. Supports requests by consumers for specific versions explicitly (e.g., by passing a version number with the requests) or implicitly (e.g., by using a request that can be resolved to a specific version).
6. If an explicit version number is not provided and implicit resolution fails, routes requests to the default version.
7. If a requested version can be identified and that version is available, routes request to that version.
8. If requested version can be identified and that version is not available, but there is another version that is designated as compatible to it, routes request to the compatible version.
9. If requested version can be identified, that version is not available and no compatible version can be found, rejects the request.
10. Provides that behaviors described above in requirements 1 through 9 are available declaratively (i.e., through configuration, rather than coding).
11. Supports implementation of a custom versioning aspect that may be used to enhance or override behaviors described above in requirements 5 through 9. For example, if requested version is unavailable and no compatible versions have been specified, an aspect enforcement method for such an aspect may transform the request into a form that can be understood by one of the available versions, rather than the request being rejected. In such embodiments, a corresponding transformation of the response may occur upon its return.
12. Advertises the WSDL corresponding to the default version. However, clients may be able to view and retrieve WSDLs for all currently active versions.
13. Distinguishes between non-disruptive and potentially disruptive actions. For example, adding a new service version or retiring a version for which a compatible version exists may be non-disruptive, while retiring a deprecated version, changing the default version, or changing existing version numbers may in some embodiments be disruptive. The versioning mechanism may be integrated with change management mechanisms such as lease mechanisms and/or notification mechanisms and may be able to trigger corresponding functions following a potentially disruptive action.
14. When a user designates a version as compatible to another, performs basic validation (check for missing operations, incompatible massages, etc.).

In order to keep WSDLs in synchronization with all supported transformations, in various embodiments, a service governance framework may support virtualization techniques that meet some or all of the following common requirements for congruent WSDL transformations:
1. Provides all consumer-facing WSDLs to service requesters
2. Does not require a specific mechanism by which WSDLs are exposed to the service consumer
3. Does not expose service implementation WSDLs to service consumers
4. Does not expose service implementation endpoints to service consumers As previously noted, one of the core benefits of SOA is reuse, which means that ideally every service may be implemented once and then used throughout the enterprise. In other words, a business service such as "InvoiceCustomer" may only have to be developed once and then may be used in hundreds of places across dozens of applications for multitude of purposes. However, it is unlikely that the exact same interface, granularity, vocabulary, and level of abstraction will be right for all possible service uses. Thus, creating a single implementation that would satisfy all existing and future uses out of the box may not be realistic, since the implementation may need to be infinitely flexible to work on different levels of abstractions, with different granularities, with different sets of defaults and assumptions, etc. A more realistic approach may be applied in the context of a comprehensive aspect-based SOA governance solution, as described herein. This architecture may natively support service refinement through well-defined, reusable refinement aspects (i.e., refinement methods). These refinement methods may be viewed as a sixth level in the virtualization hierarchy described above, but in the general case it may not be possible to implement automatic WSDL transformations at this level. Similar to service versioning, which allows services to evolve in time to meet the changing consumer needs, refinement methods may allow services to adapt to different usage scenarios without unnecessary duplication and service proliferation. A universal SOA governance solution, such as the service governance framework described herein, may allow management of service offerings based on refinement in a manner similar to those based on different security models or service level agreements (SLAs).

In some embodiments, a service producer may define and implement a reasonable service implementation, which may be published and may later be combined with one or more refinement aspects into a number of service offerings. Service consumers may then select and bind to the service offering which best matches their usage scenarios. In some embodiments, the use of refinement aspects that implement common refinement concerns may be combined with support for decorating individual services with individual refinement methods or filters to address one-off requirements. In such embodiments, when a new use case with one or more unique requirements is discovered, a new service offering may be created by combining the existing service implementation with a new refinement method, which may be developed by a service consumer, a service producer, or a third party. In such embodiments, the service producer and any existing consumers of the basic or refined service offerings may not be affected by this change. However, any future fixes and/or improvements of the service implementation may be immediately available to all of the consumers.

Listed below are some examples of real-life SOA challenges that may be successfully resolved through the use of service refinement methods, as described above:

Customer Information Service: Following SOA best practices, a company may implement a single coarse-grained service "getCustomerInfo" which may provide consolidated customer information, instead of multiple fine-grained services, such as "getCustomerName," "getCustomerAddress," etc. This service may work well for most consumers, but may not work well, for example, for a remote application that requires only minimal customer information and that accesses the service over an unsecured, low bandwidth, high cost wireless connection. A simple granularity refinement method may allow the reuse of the common lookup service for this remote application.

Employee Lookup Service: A company may develop a service to lookup employee information based on a number of criteria. Such a service may be useful in a number of applications run by different departments, including payroll, HR and training. However, although all of these departments and applications include the concept of an "employee," each attached a different meaning to this term. For example, in a payroll system, employees may refer to everyone who gets paid, including permanent employees and contractors. On the other hand, a training system may use this term only when referring to permanent full-time employees who were eligible for training, and HR software may be required to keep track of former employees as well as current ones. A number of straightforward semantic refinement methods may facilitate the implementation of a common lookup service, which may not be tied to any particular definition of "employee," thus reducing coupling. In this example, if a new system developed in the legal department that needs to track employees based on nationality, the same lookup service may be reused without any changes.

In another example, the same Employee Lookup Service described above may be made compliant to new privacy regulations through the use of a vocabulary refinement method that transparently translates employee social security numbers (which were previously used as employee identification numbers) into surrogate IDs for consumers invoking the service from overseas subsidiaries.

As previously noted, a service governance framework may in some embodiments support virtual service components that are environment-aware. In other words, they may behave differently, as appropriate, in various software development life cycle (SDLC) environments and in different SDLC phases, or states. In such embodiments, the modular architecture of the service governance framework may mean that service offerings are not tied to service implementations, thus facilitating service evolution such that the service life cycle does not affect the SDLC. In some embodiments, all service interactions may be governed through a single, intuitive interface. This may facilitate seamless adoption of emerging IT standards, provide support for and approval and review process, and provide the ability to provide governance in "brownfield" environments (i.e., environments that include constraints imposed by prior work or existing structure).

Developers typically code for service invocation in the development environment in which they work. When creating a service or composite application, the developer may choose a target service to invoke. The implementation of that target service may reside in the development environment, in some embodiments. In other embodiments, it may reside in an independent environment, in another business unit, or in another organization altogether. Once the developer defines which service he wishes to invoke, the implementation appropriate to the development environment may be resolved. After development has been completed, the services and composite applications that have been developed may need to be moved (migrated) into one or more test environments as part of the service development life cycle. Once migrated, the external services upon which the migrated service or composite application are dependent may have changed. It is possible, even likely, that the service implementations which are appropriate to the test environment are not the same implementations that were invoked in the development environment. As the developed service or composite application continues to migrate through the different environments that support the service development life cycle, the problem repeats itself. In some embodiments, service virtualization may provide a mechanism by which the resolution of the appropriate service implementation.

In various embodiments, a service governance framework may support SLDC-aware virtualization techniques that meet some or all of the following business requirements:

1. Provides support for all stages (e.g., states) of the service development life cycle, including development, user acceptance testing (UAT), system testing, production, and sustaining.
2. Allows for developers, testers, QA specialists and production operators to register web service implementations at all stages of development process. Provides visibility and accessibility of web service implementations to web service clients at all stages.
3. Provides only minor changes to existing web service development processes and code promotion.
4. Does not prevent an entire solution from being migrated between different environments.
5. Allows promotion and demotion of individual services
6. Automatically routes service requests to the correct service implementation
7. Provides isolation of higher level environments from changes made in lower ones
8. Allows service developers to register new services and service versions as soon as they are created
9. Provides consistent data across all environments
10. Is able to evolve to meet the future needs In various embodiments, a service governance framework may support SLDC-aware virtualization techniques that make some or all of the following assumptions, or adhere to these constraints:

1. A single service virtualization governance database may be used to govern web services during development, testing and integration. A separate instance of service virtualization governance database may be used to govern web services in the production environment.
2. Support may be provided for only single instances of user acceptance testing, pre-production and production environments.
3. Support may be provided for multiple instances of development/testing environments.
4. All instances of non-production environments may be connected and reachable via TCP/IP.
5. There may be a single instance of the service delivery agent associated with every environment in which governance is required (SDA instances will not be shared across environments). Each instance may know (e.g. via property file) with which environment it is associated. Similarly, service clients (e.g. other services or composite applications) may be able to determine in which environment they are deployed and locate the end-point of SDA from that environment. In this way, the solution may be architected to work without service virtualization, and the framework may not need to implement any special support for that functionality. Specifically, service virtualization mechanisms may not be required to rewrite the location attribute of a <soap:address> element in the client-side WSDLs for each environment.

6. Changes to the environment configuration (such as the addition of new environments and service groups or changes of network addresses) that are assumed to be infrequent may not be supported with dedicated GUI screens, but may be managed through other GUI screens.

In various embodiments, a service governance framework may support SLDC-aware virtualization techniques that meet some or all of the following functional requirements:

1. Allows service developers to register new services and service versions as soon as they exist in the development environment.
2. Allows client (e.g., portal) developers to obtain client-side WSDLs for governed services that only exist in the development environment.
3. Provides service promotion and demotion between different environments. Such promotion/demotion may happen one environment at a time, e.g., from development to UAT, from UAT to pre-production, or from pre-production to production.
4. Allows migration of services that have been promoted to production from pre-production to production database.
5. Creates a snapshot of pre-production database based on this migration and moves it to production in its entirety.
6. Routes service requests to the corresponding service implementations from specific environments associated with an SDA.
7. When replicating a service virtualization database (either from pre-production to production or to a mirror environment), does not require data manipulation to account for differences between environments.

As used herein, the phrase "SOA governance" may take on an expanded definition as compared to its use in reference to standard SOA implementations. In the context of the service governance framework described herein, SOA governance may refer to a combination of processes, practices and tools which enable a business to create, communicate, enforce, manage, and monitor corporate policies, and to manage service evolution and life cycle. The business policies of such a service governance framework may in various embodiments be manifested in the creation of virtual services from existing assets, in contracts composed of non-functional aspects, in catalogs of governance artifacts that can be referenced and re-used, and in the creation of endpoints for any standard/protocol. The service governance framework may support communication mechanisms to make policies and governance artifacts available to decision-makers and consumers, to avoid redundancy, and to share information with humans and other systems. In some embodiments, the service governance framework may enforce different roles (e.g., at design-time), different policies (e.g., at run-time), service level agreements (SLAs), security requirements, and standards compliance (where applicable), and may delegate enforcement to existing or third party components. A service governance framework may in some embodiments manage policies by re-configure them on the fly without affecting service implementations, and may govern all service interactions through a single intuitive interface, as described herein. The service governance framework may also monitor various characteristics of a service offering, such as quality of service, reliability, performance, service utilization (e.g., for chargeback), and/or audit data.

In some embodiments, a service governance framework may include an underlying common information model. When a service is registered into such a system, its artifacts and metadata may be stored in a repository, the organization and structure of which may be captured in the model. While the registries and repositories of other SOA architectures may capture similar data, they may be limited to specific technologies. For example, UDDI registries and/or third party repositories may be used to capture Web services metadata. However, the scope of the service governance framework described herein goes beyond web services. Therefore, the underlying system model may be designed in such a way to enable the capture of metadata of any kind of service. In some embodiments, the data captured in such a model may be used later to create virtual services by composing, suppressing, and/or manipulating existing services metadata. An information model suitable for use in a service governance framework is described in more detail below, according to one embodiment.

In some cases, not all groups in a given organization may require visibility into all levels of service virtualization or access to the configuration of those virtualizations. For example, service developers may only be responsible for service implementation details, while business people may only be responsible for non-functional aspects of the service, e.g., management, monitoring, security, etc. Therefore, in some embodiments, different groups and/or individuals may be permitted to look into new service requirements or new consumption scenarios of existing services to see if they may be satisfied using the existing implementations by providing a virtual vision of an existing service or if they require creation of a brand new service in the system. In some embodiments, there may be three different roles (or view points) defined in the service governance framework: SOA developer, business analyst and governance officer. In such embodiments, an SOA developer may be responsible for (and authorized to specify) service implementation details, a business analyst may be responsible for (and authorized to specify) the non-functional aspects of the service, and a governance officer may be responsible for (and authorized to provide) virtual services (virtualization) and the service offerings. Various functions that may be performed by users in each of these roles are described in more detail below, according to one embodiment.

Note that even though most of the virtualization techniques described herein are applied in the design phase, some of the techniques may also require runtime manipulations. In other words, the behavior of operations executed by the framework on behalf of a consumer may also be modified according to functional parameters and/or non-functional aspects associated with the operation. For example, binding level virtualization techniques may be related to protocol and transportation details of the services, and may require a runtime binding translator to translate the binding details as required by the service implementation, in some embodiments. Other examples are included below with respect to the virtualization techniques described herein.

As previously noted, a WSDL may in some embodiments be used as the interface between a service provider and a consumer, and may serve as the only service view (or entry) point for a consumer. In some embodiments, a virtual vision of a service may be created using a WSDL transformation. For example, if the endpoint of a service in a WSDL is manipulated to point to a proxy, then the requests from the consumers of this service may be redirected to the proxy instead of to the actual service implementation, resulting in endpoint level virtualization. Such transformations may be done during the design phase and the resulting WSDLS may be exposed to the consumer.

As mentioned earlier, such WSDL transformations alone may not be sufficient to implement some of the virtualization techniques described herein. In some embodiments, various virtualization techniques may also require runtime intermediate processing. For example, similar to other currently available governance solutions, in some embodiments, the service governance framework described herein may be gateway based and may use endpoint level virtualization techniques for routing service requests. These gateways may in some embodiments carry the intermediate processing logic to enforce policies on the incoming requests and to forward them to the actual service implementations, i.e. changing the service endpoint during runtime. Various other virtualization techniques (including some embodiments of the binding level, message level, and/or operation level virtualization techniques described below) may also require some runtime processing (along with WSDL transformations at design time).

Service management in a service governance framework may in some embodiments be performed through a single intuitive interface, e.g., a service governance administration console. Management operations that may be supported include, but are not limited to:
- Discovery and mediation, which may include advanced artifact search tools
- Meta-data management
- Dynamic configuration
- Real-time control
- Fault compensation Note that in various embodiments, any or all artifacts (e.g., end points, governance contracts, aspect enforcement methods, and aspects) may be reusable and re-combinable through the administration console.

In various embodiments, a governance contract may specify the service agreement between consumers and providers. Such as contract may be composed of any number of clauses, where a clause includes an aspect paired with a specific value. Note that a value specified in a clause may represent a value for a single configurable parameter, or may represent a value for a complex policy such as a WS-Security Policy document. Two examples of clauses are given below:
throughput_TPS=20
lease_expiration=12-01-2008

In general, aspects may be non-functional attributes that are relevant to the business policies of a given organization, and may be the units of policy construction (i.e., the "molecules" of governance). As described herein, aspects may be used to bind a service to a specific policy condition. Various aspects may be universal (e.g., security-related aspects), industry-specific (e.g., aspects related to HIPAA compliance), or unique for a given enterprise, service, application, provider, and/or consumer. The use of aspects described herein may enable a service governance framework to be implemented independent of any particular standard policy or governance approach.

Enforcement of aspects may in various embodiments be delegated to existing implementations or to third party tools, and there may be multiple enforcement points (e.g., inbound, outbound, or both). In addition, aspects may be subject to multiple enforcement levels. Note that in various embodiments, each aspect clause of a contract may be enforced separately, and/or may be enforced at a different enforcement level. For example, in one embodiment, the following enforcement levels may be supported:
- Advertised—the lowest level. The associated aspect value may be specified in human-readable form only, with no formal semantics or enforcement. For example, for the "throughput" aspect described above, the advertised value may be, "The system has sufficient throughput to sustain non-batch loads during normal business hours."
- Specified—similar to Advertised, but the aspect value may be specified in a formal, machine-readable form with exact semantics. For example, a "throughput" aspect value may be specified as "10 TPS."
- Reported—similar to Specified, but the system may actively monitor compliance and report violations. This level may require the use of an aspect enforcement method, as described herein. For example, a "throughput" enforcement method may monitor throughput, and may alert and/or notify the service provider and/or consumer when it falls below the specified value (e.g., 10 TPS).
- Enforced—similar to Reported, but in addition to reporting non-compliance, the system may attempt to take corrective action when non-compliance occurs. For example, if throughput falls below the specified value, a "throughput" enforcement method may alert and/or notify interested parties and may use a service management interface to issue a directive to increase capacity.

Monitoring and reporting of aspect values may in some embodiments be performed through a service governance framework console, as described herein. For example, as described in more detail below, service offerings may be activated and deactivated through the console, and/or the console may be used to access (e.g., search and review) various governance contracts. In various embodiments, aspects may be monitored to provide reports on service usage in real time, to determine reliability, performance, or quality of service. As noted above, monitoring of aspects may in some embodiments be delegated to existing monitoring tools, and may not need to be recreated in the service governance framework itself.

Service life cycle management may in some embodiments be provided through the service governance framework described herein. For example, the framework may in various embodiments support versioning and deprecation, retirement and backward compatibility, service state management (e.g., proposed, pending, approved), environment staging (e.g., development, QA, production, or custom environments), and/or service evolution (e.g., through versions, virtualizations, and/or specialization).

A service governance framework may include functionality to facilitate development, deployment, and consuming of virtual services, as described herein. FIG. 1 illustrates a conceptual model of such a framework, according to one embodiment. In this example, service governance framework 100 includes an analysis engine 110, a governance designer 120, a console 123, and a governance enforcement engine 130. Governance designer 120 and analysis engine 110 may be accessed by analysts, developers of service offerings, and/or governance officers 111 through console 123, in this example. These users may interact with governance designer 120 to define one or more contracts, such as contract A (shown as 121 in FIG. 1) and contract B (shown as 122). These contracts may be saved for use in various service offerings defined through service governance framework 100. As described above, each contract may include one or more clauses, each of which maps an aspect to specified aspect value.

As illustrated in FIG. 1, consumers of services (shown as 131) may invoke operations of a virtual service offering using the service bindings 132 defined for the virtual service offering. As described herein, the service bindings 132 may use the same transport mechanisms and/or protocol(s) as the underlying service implementations 134 (shown as implementation bindings 133), or may use different transport mechanisms and/or protocol(s) then implementation bindings 133. In this example, governance enforcement engine 130 may invoke various aspect enforcement methods 137 to enforce the governance aspects associated with the operations invoked by consumers 131 (i.e., those specified in an associated contract, such as 121 or 122).

As illustrated in FIG. 1, the service implementations themselves (e.g., one or more computer systems executing code to realize the operations) may be considered to be outside of and separate from service governance framework 100, and may be physically located in one or more locations that are remote from service governance framework 100. Similarly, service governance framework 100 may not include its own (e.g., a customized) underlying infrastructure, but may be built on top of, or be coupled to, an existing infrastructure 135, as shown in this example.

In various embodiments, every service request may pass through a series of aspect enforcement methods as defined in one or more associated contracts, and each method may enforce a single clause. As illustrated in FIG. 1, aspect enforcement methods may be self-contained methods. Therefore, additional enforcement methods may be added without code changes to the framework and/or to other enforcement methods. In some embodiments, consumer-facing service interfaces (i.e., front-end bindings) may adhere to the same protocols as the service implementations themselves (i.e., back-end binding). In addition, reuse may occur between these back-end bindings and aspect and/or refinement methods. In other words, the back-end bindings may be used to invoke both service implementations and these methods, in some embodiments.

The service governance framework described herein may in some embodiment be provided as a J2EE™ application, or as an application ported to any Java™ Enterprise Edition platform or Java™ Enterprise Edition compliant application server. It may include support for any full-featured JDBC™ database for persistence (e.g., an Oracle® 10 g database from Oracle Corporation). In some embodiments, the framework may provide support for various existing service registries, such as those compliant with Universal Description, Discovery and Integration (UDDI), and/or the Java™ API for XML Registries (JAXR), and may integrate such registries into the framework. The framework may also include various pluggable caches (e.g., open source and/or commercial caches), in different embodiments, and may be supported on platforms having various operating systems, including, but not limited to various 32-bit and 64-bit versions of the Windows® operating system or Solaris™ operating system, and on various Linux® based platforms.

The non-functional aspects and aspect enforcement methods specified by a given contract and supported within the service governance framework may include aspects of any of the following common aspect types:

Security-related aspects—for authentication, authorization (e.g., SAML, WSS X509 certificate, WSS UserName), encryption, or digital signatures Throttling-related aspects—which may impose throughput and/or load limits Lease enforcement aspects, e.g., to enforce service expiration dates Monitoring-related aspects—which may provide a link to reporting and alerting tools, incorporate third party enterprise tools (e.g., enterprise monitoring, reporting, and notification systems), provide simple logging of service metrics or a complex monitoring model, and/or record service metrics and performance in real time Chargeback-related aspects, e.g., for metering service usage, allocating costs, and/or billing service consumers for throughput Version enforcement aspects Advanced routing aspects Aspects for translating message formats In various embodiments, aspects and aspect enforcement methods may be classified in aspect groups, e.g., for display and selection within the framework GUI, or so that they may share parameters and/or characteristics. While each enterprise may customize its list of aspect groups, the following aspect groups may be commonly used:

Security

Availability

Accountability

Management

Performance

In addition to supporting commonly used aspects, in various embodiments, the framework may support the addition of new aspects, the overriding of existing aspects, and/or the use of multiple versions of a given aspect simultaneously. For example, a specific "censorship" aspect may be added that discovers and filters out sensitive information from messages, adding a custom (proprietary) security mechanism. In this example, clients may use both a standard aspect (e.g., when working with an external business partner), and the proprietary one (e.g., when communicating internally with the system) in parallel. In some embodiments, a common underlying service implementation may be exposed as two different virtual services for these two consumption scenarios.

As previously noted, a governance contract may be enforced by aspect enforcement methods associated with each of the clauses of the contract. These aspect enforcement methods may be provided by the framework as executable code that enforces the policy behind an aspect by performing various actions. For example, an aspect enforcement method may in various embodiments accept/reject messages based on dynamic criteria, record metrics and events, raise alerts, and/or enforce policy through corrective action. As noted above, some aspect methods may transform request and/or response messages, as needed. For example, they may perform encryption/decryption, message translation/transformation, and may enrich or censor message content, according to the policies, contracts, and/or configuration of a virtual service offering to which they apply. Aspect enforcement methods may in some embodiments directly leverage other aspect enforcement methods, third party tools, and/or existing point governance solutions, in some embodiments. They may support various languages, platforms, protocols and transport mechanisms, in different embodiments, and may evolve over time, e.g., to support new standards or meet new compliance needs.

As previously noted, aspect enforcement may in some embodiments be delegated to exiting implementations and/or third party tools. Multiple approaches to such delegation may be supported, such as complete delegation, in which legacy systems may implement all required governance functionality and expose it via an API; partial delegation, in which legacy systems may implement a subset of the required governance functionality and expose it via an API; and orchestrated delegation, in which legacy systems may implement governance functionality but may not expose it through an easily accessible API. In various embodiments, the delegated governance may employ any or all of the virtualization techniques described herein, including endpoint level virtualization, binding level virtualization (e.g., protocol transformation), message level virtualization (e.g., message header or content transformation for a destination external aspect), operation level virtualization (e.g., to resolve naming issues), and/or service level virtualization (e.g. for aspect refinement, staging, etc.). The governance delegation level (e.g., complete, partial, or orchestrated) may in some embodiments be specified for a virtual service offering by a user (e.g., a service developer, business analyst, or governance officer) at design time (e.g., through the GUI).

Figure 2:
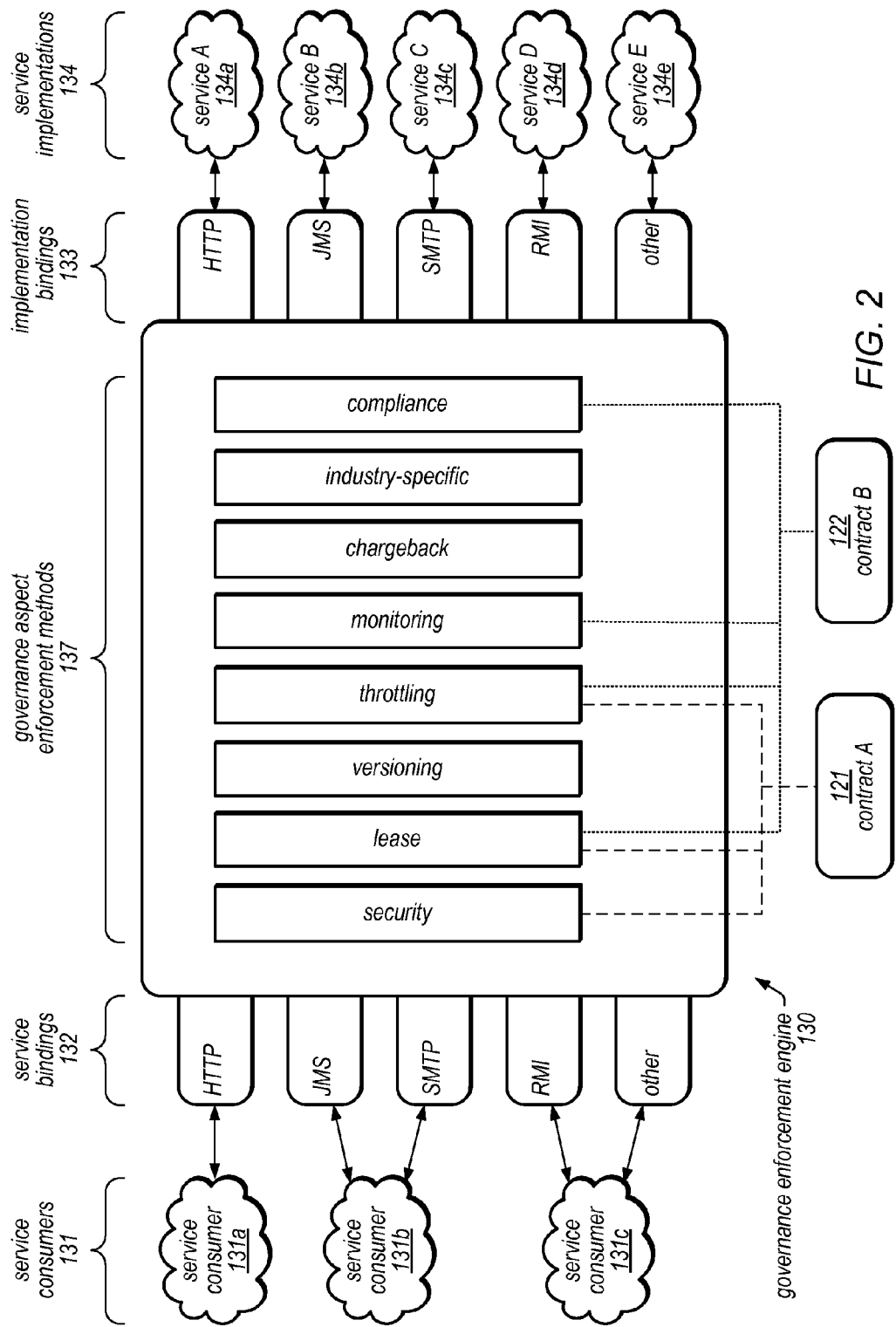
FIG. 2 is a block diagram illustrating a conceptual model of a governance enforcement engine, according to one or more embodiments.

The conceptual diagram in FIG. 2 illustrates one embodiment of the architecture of a governance enforcement engine, such as governance enforcement engine 130 of FIG. 1. In this example, various service consumers 131 request services from one or more virtual service offerings managed by governance enforcement engine 130. As shown in FIG. 2, these service consumers 131 may invoke services according to any of several transport mechanisms and/or protocols (shown as service bindings 132). For example, 131a may invoke one or more operations using HTTP, while service consumer 131b may invoke one or more operations using JMS or SMTP, and service consumer 131c may invoke one or more operations using RMI or another type of service binding.

As described above, service requests from consumers 131 may pass through a series of aspect enforcement methods 137, and these aspect enforcement methods may each enforce one clause of a contract associated with a requested service and/or operation. In the example illustrated in FIG. 2, aspect enforcement methods 137 involving security, leasing, and throttling may be invoked in response to a first service request, according to respective clauses included in contract A (shown as 121). Similarly, aspect enforcement methods 137 involving leasing, throttling, monitoring, and compliance may be invoked in response to a second service request, according to respective clauses included in contract B (shown as 122).

As described above, service implementations 134 which realize the requested operations may use implementation bindings 133 that may be different from, and independent of, the service bindings 132 used to invoke their execution. In the example illustrated in FIG. 2, service A (shown as 134a) may use HTTP, service B (134b) may use JMS, service C (134c) may use SMTP, service D (134d) may use RMI, and service R (134e) may use another transport mechanism and/or protocol. As described herein, each of the service implementations 134 may provide one or more operations of a virtual service component that may be provided to service consumers 131 through a virtual service offering.

Figure 3:
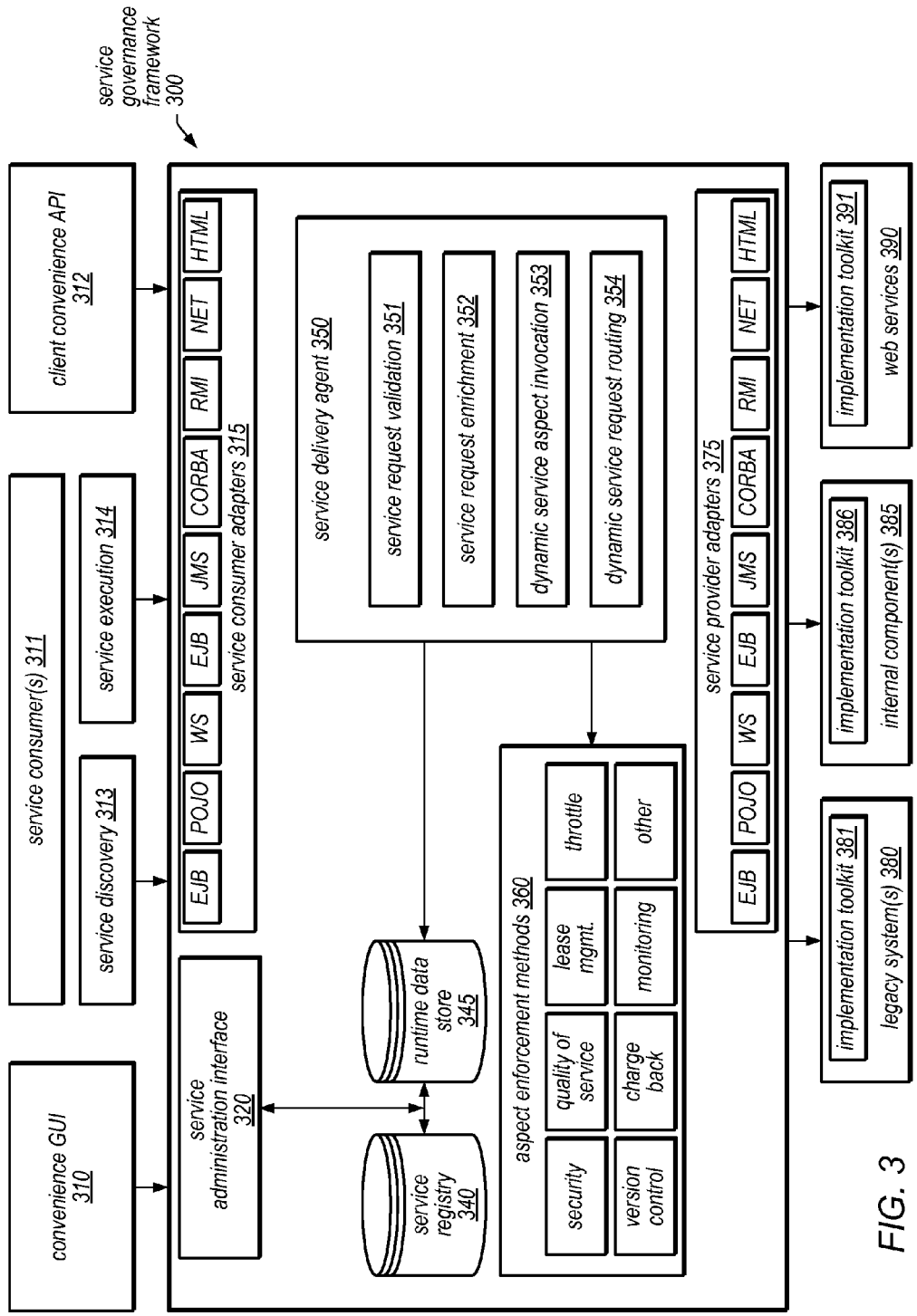
FIG. 3 is a block diagram illustrating an architectural model of a framework for development and deployment of virtualized enterprise services, according to one or more embodiments.

A more detailed architectural model of a service governance framework, such as service governance framework 100, is illustrated in FIG. 3, according to one embodiment. In this example, analysts, service developers, and/or governance officers may interact with framework 300 through a convenience GUI 310, which may provide a console through which to perform the various operations available to them. Service consumers 311 may interact directly with framework 300 to discover virtual service offerings through a service discovery interface 313 and/or to execute operations of a virtual service offering through service execution interface 314, in this example. These interfaces may be provided through a consumer-facing GUI, in some embodiments. As illustrated in FIG. 3, client applications may interact with framework 300 through an application programming interface (API), such as client convenience API 312. For example, rather than interacting directly with framework 300, a consumer may invoke various operations of a virtual service offering by including calls to the operations (in accordance with API 312) in a client application.

As described above, service implementations and service consumers may communicate with governance framework 300 using a variety of transport mechanisms and protocols. Therefore, framework 300 may include a plurality of service consumer adapters 315 and service provider adapters 375 through which messages of different types may be exchanges with framework 300. As illustrated in FIG. 3, service implementations may be provided by one or more legacy systems 380, one or more internal components 385, and/or by one or more remote or external web services 390. Each of these providers may implement a respective toolkit (shown as implementation toolkits 381, 386, and 391) to execute requested operations of a virtual service offering.

In the example illustrated in FIG. 3, service governance framework 300 may include a service delivery agent 350, which may process requests for services from service consumers and manage the delivery of services to those service consumers. Service delivery agent 350 may include, for example, a service request validation mechanism 351, a service request enrichment mechanism 352, a dynamic service aspect invocation mechanism 353, and a dynamic service request routing mechanism 354. Dynamic service aspect invocation 353 may involve invoking one or more aspect enforcement methods 360, in this example. Service delivery agent 350, and various components thereof, may access runtime data store 345. Runtime data store 345 may store intermediate data produced while processing service requests and/or delivering services (e.g., for logging, billing, auditing, alerts, etc), or data to support aspect enforcement methods. For example, it may store the number of times a service has been called over a given time period (in order to support a throttling algorithm), or a list of fields in a service response message that should be filtered out in order to comply with government restrictions on dissemination of taxpayer identification information or other personal information. Runtime data store 345 and/or service delivery agent 350 may also access service registry 340, which may store an information model indicating mappings between virtual service offerings and their constituent virtual components, including contracts, states, virtual methods, refinement methods, compatibility information, and version numbers, in various embodiments. In some embodiments, registry 340 may also store the components associated with each of the virtual service offerings, while in other embodiments, these components may be stored in a separate repository.

As noted above, analysts, service developers, and/or governance officers may communicate with framework 300 using a convenience GUI to access a service administration interface 320. Service administration interface 320 may provide mechanisms for these users to create, configure, modify, and/or activate virtual service offerings and/or virtual service components or governance contracts thereof, as described herein. If a new virtual service offering is created through service administration interface 320, it may be registered in service registry 340.

Figure 4:
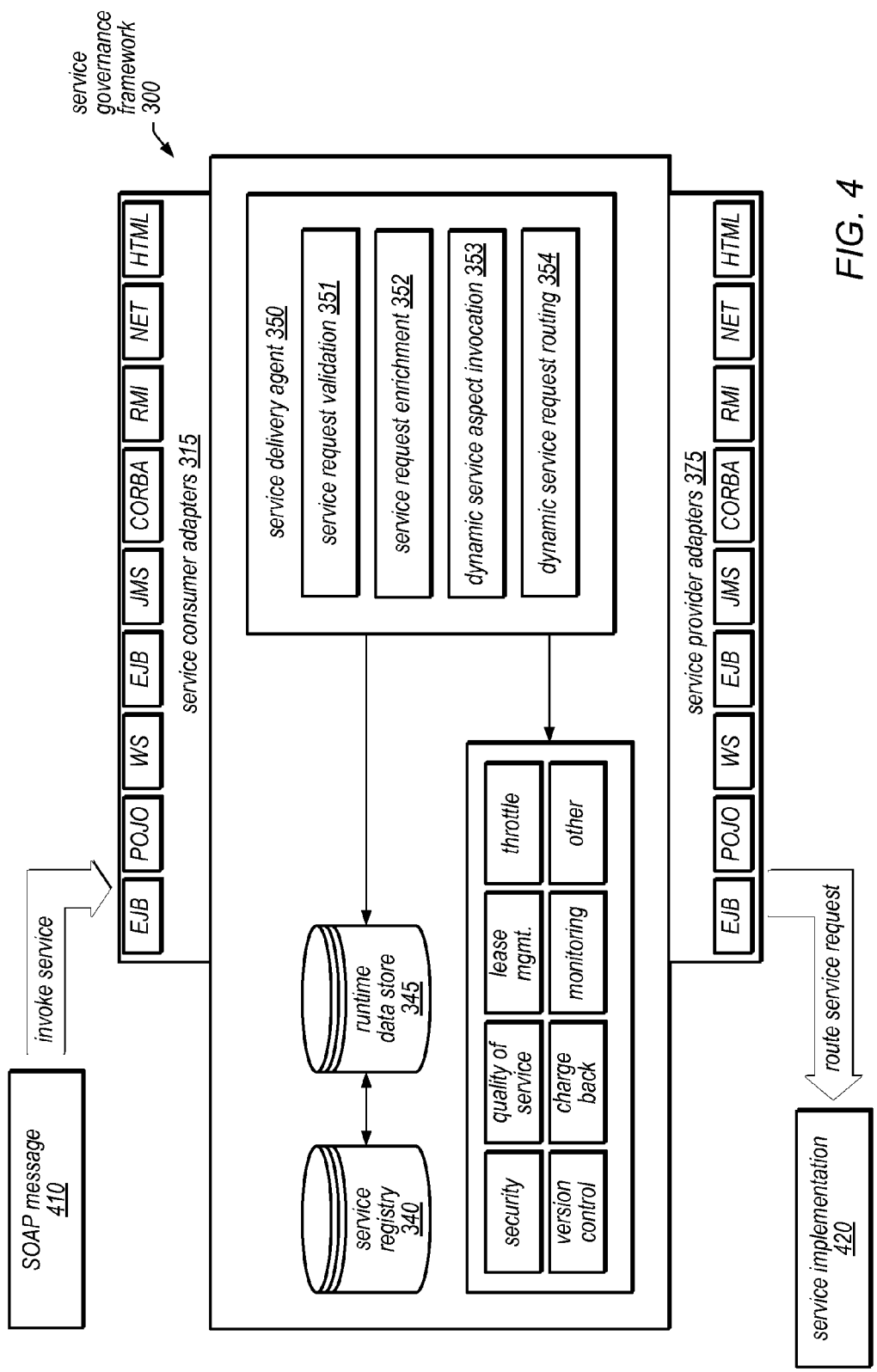
FIG. 4 is a block diagram illustrating an architectural model of a framework configured to provide virtualized enterprise services to service consumers, according to one or more embodiments.

FIG. 4 illustrates the use of a service governance framework, such as service governance framework 300 of FIG. 3, when invoking an operation of a virtual service offering. In this example, a service request may be communicated to framework 300 using a SOAP message 410. This message may be received by framework 300 through one of the plurality of service consumer adapters 315. In the example illustrated in FIG. 4, service delivery agent 350 may validate the service request, using service request validation mechanism 351 and/or may enrich the service request, using service request enrichment mechanism 352. For example, a method of service request enrichment mechanism 352 may transform the message by adding addition headers to the message, adding additional content to the message, or modifying the message through a refinement method, in various embodiments.

In the example illustrated in FIG. 4, one or more aspect enforcement methods 360 may be invoked by dynamic service aspect invocation mechanism 353, according to clauses included in a governance contract associated with the virtual service offering. In this example, service delivery agent 350 and the components thereof may access service registry 340 and/or runtime data store 345 to obtain information associated with the virtual service offering (e.g., the associated governance contract and clauses thereof). Assuming the service request is validated, dynamic service request routing mechanism 354 may route the request to the appropriate service provider to execute the request, in accordance with bindings, endpoints, and governance aspects associated with the virtual service offering, as stored in service registry 340. The service request may be routed to the provider of service implementation 420 through one of a plurality of service provider adapters 375, according to the transport mechanisms and/or protocols supported by the service implementation 420, in this example.

Figure 5:
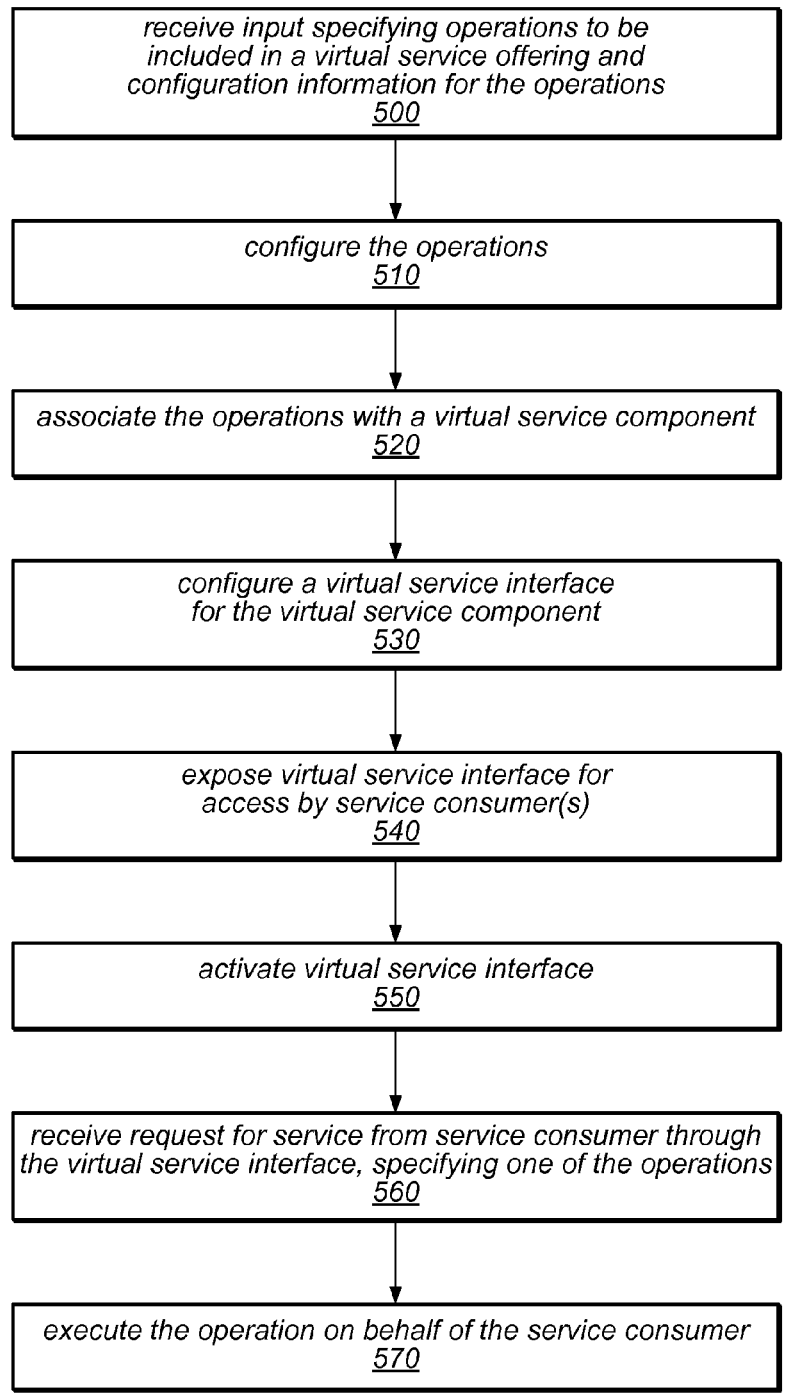
FIG. 5 is a flowchart illustrating a method for generating and providing a virtualized enterprise service in a service governance framework, according to one or more embodiments.

The use of a service governance framework, as described herein, may be further illustrated by the flow diagrams in FIGS. 5-8, according to various embodiments. FIG. 5, for example, illustrates a method for a service governance framework to generate and provide a virtualized enterprise service, according to one embodiment. In this example, a service governance framework may receive input specifying one or more operations to be included in a virtual service offering and configuration information for the operations, as in 500. In various embodiments, this input may be received through a console (such as console 123 of FIG. 1), which may provide a GUI (such as convenience GUI 310 of FIG. 3), or through any other suitable input means. One example of a console for a service governance framework is illustrated in FIGS. 11-21, and discussed in detail below. In the example illustrated in FIG. 5, the specified operations may be configured by the service governance framework, as in 510. For example, they may be modified according to configuration information provided through the console, such as information specifying a name for each operation (e.g. a name other than the name of the operation as provided by the source of the operation), an action to be taken (e.g., other than a default action), a binding type, and/or an "undo" operation, or setting one or more other configurable parameters for each operation, such as those described herein.

In the example illustrated in FIG. 5, the operations may be associated with a virtual service component, which may or may not include all the operations of a new virtual service offering. This is illustrated in 520. A virtual service interface may be configured for the virtual service component, as in 530. For example, a WSDL associated with each operation may be transformed (e.g., modified or supplemented) in accordance with name changes, binding types or undo operations, or the selection of other parameter values for the operation, in some embodiments. This virtual service component may then be exposed to provide access by service consumers, as in 540. In this example, before service consumers may invoke the operations of the virtual service component, the virtual service interface may be activated, as in 550. At this point, the virtual service component is made available as a virtual service offering.

Once the virtual service component is made available as a virtual service offering through the governance framework, the framework may receive a request for service from a service consumer through the virtual service interface, where the request specifies an operation of the virtual service component. This is shown as 560. The framework may execute the operation on behalf of the service consumer, as in 570. In some embodiments, executing the operation may include validating the service request, enriching the service request, invoking one or more aspect enforcement methods, and/or routing the service request to an appropriate service provider, as described above.

Figure 6:
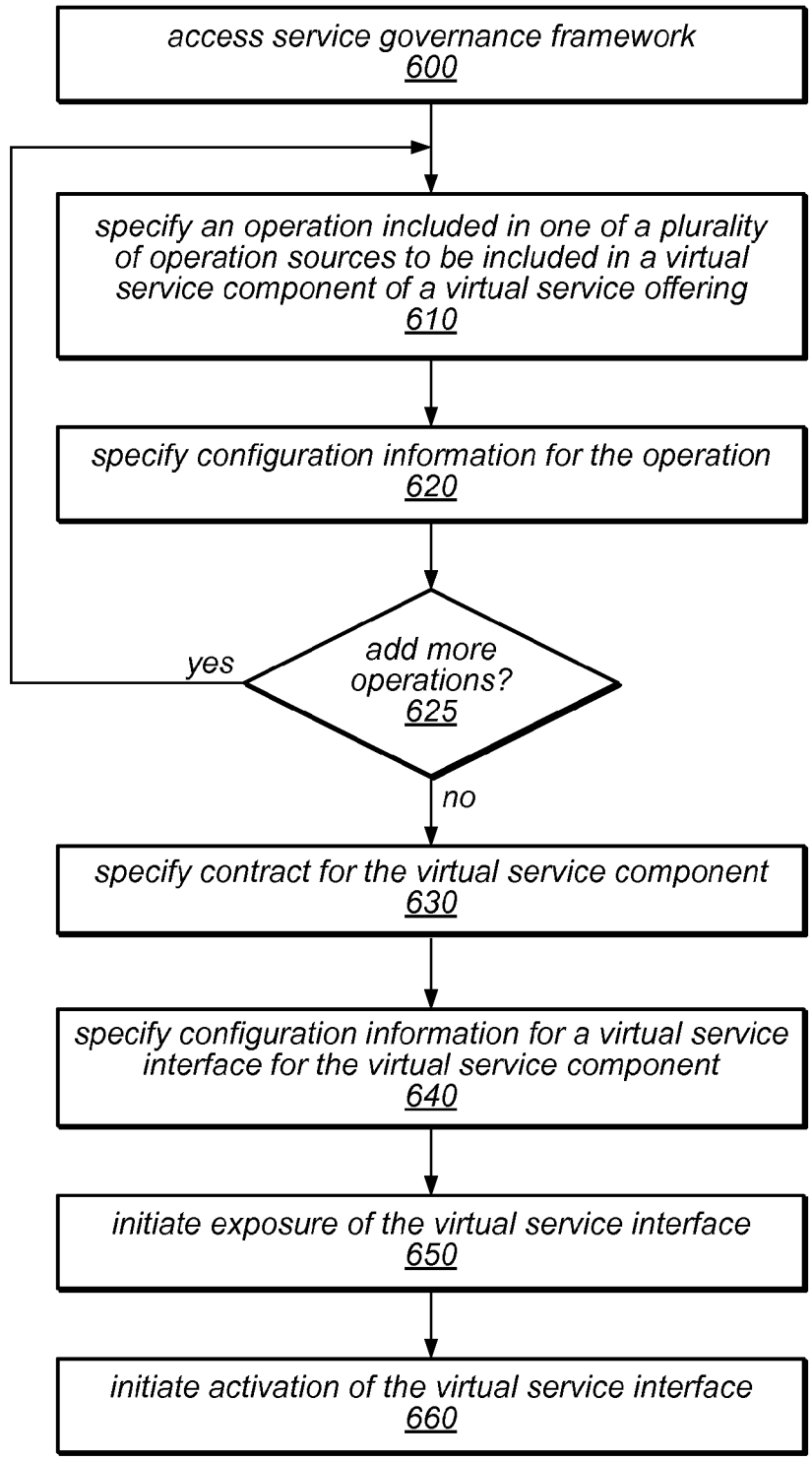
FIG. 6 is a flowchart illustrating a method for developing and deploying a virtualized service component using a service governance framework, according to one or more embodiments.

FIG. 6 illustrates a method for developing and deploying a virtualized service component using a service governance framework, according to one embodiment. In this example, a user, such as a service developer, may access the service governance framework, as in 600. The user may specify an operation that is one of the operations included in one of a plurality of operation sources, and that is to be included in a virtual service component of a virtual service offering. This is illustrated as 610. In some embodiments, the user may select the operation through a GUI, as described in more detail below. After selecting an operation, the user may configure the operation, as in 620. For example, the user may specify a name for the operation, an action to be taken, a binding type, an "undo" operation, or a value for a configurable parameter of the operation, as described above.

If there are more operations to be added to the virtual service component, shown as the positive exit from 625, the user may specify and configure addition operations. This is shown in FIG. 6 as the feedback to 610. If there are no more operations to be added to the virtual service component, shown as the negative exit from 625, the method may continue with the user specifying a governance contract for the virtual service component, as in 630. In the example illustrated in FIG. 6, addition configuration information, e.g., directed to a virtual service interface for the virtual service component, may be specified by the user, as in 640. Once the framework has created and/or configured the virtual service interface, the user may initiate exposure of the virtual service component, as in 650, and may initiate activation of the virtual service interface, as in 660. These operations may be initiated through the GUI, and are described in more detail below.

Figure 7:
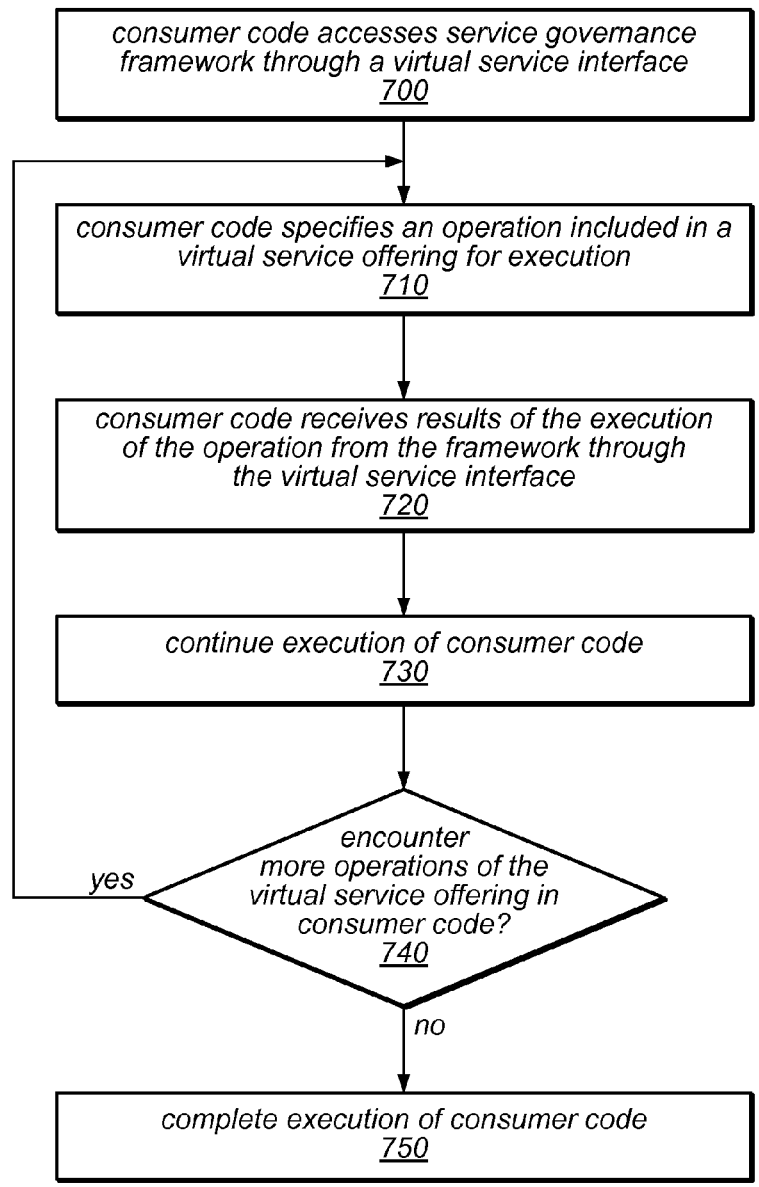
FIG. 7 is a flowchart illustrating a method for consuming a virtualized service, according to one or more embodiments.

FIG. 7 illustrates a method for consuming a virtualized service, according to one embodiment. In this example, execution of a service consumer's code begins, as in 700, and the consumer code specifies an operation included in a virtual service offering for execution, as in 710. After the framework executes the operation, as described above, the consumer code receives the results of the execution of the operation from the framework through the virtual service interface, as in 730. Execution of the consumer code then continues, as in 740. In this example, if any additional operations of the virtual service offering are encountered in the consumer code, shown as the positive exit from 750, the actions illustrated in 710-740 are repeated for the additional operations, as shown in FIG. 7. If there are no additional operations of the virtual service offering encountered in the consumer code, shown as the negative exit from 750, the consumer code may continue to execute to completion, as in 760.

Note that in other embodiments, rather than explicitly invoking an operation of a virtual service offering (e.g., using a function call), consumer code may be configured to search for a suitable operation at runtime. For example, the consumer code may specify the functionality of a service to be invoked (e.g., by specifying a service component, "process credit card information"), perform a lookup of service offerings by that component, review the results, select the service offering which best meets the consumer's non-functional criteria (e.g., according to security aspects, availability, performance, privacy, cost, etc.), and invoke that service offering.

Figure 8:
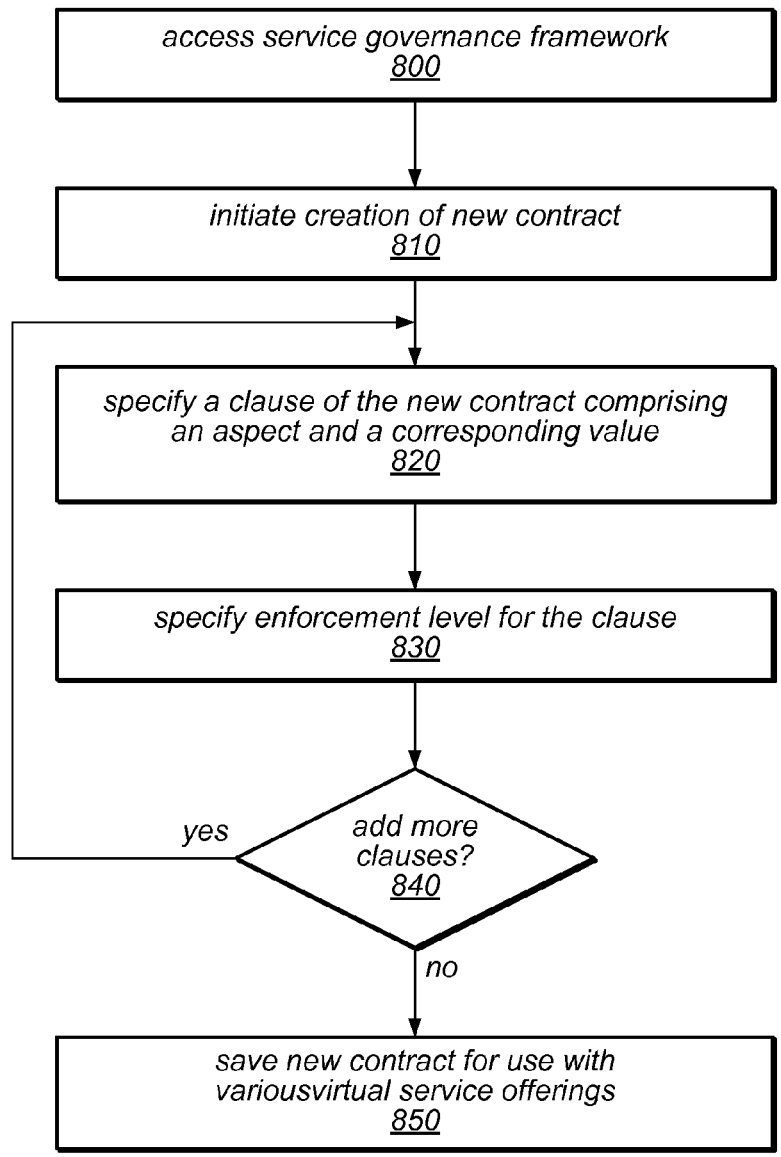
FIG. 8 is a flowchart illustrating a method for developing a governance contract, according to one or more embodiments.

As discussed above, a user (e.g., a service developer) may specify a governance contract for a virtual service component. FIG. 8 illustrates a method for developing such a governance contract, according to one embodiment. In this example, the user may access the service governance framework, as in 800, and may initiate creation of a new contract (e.g., through a GUI), as in 810. Initiating creation of a new governance contract may include specifying a name for the new governance contract. As illustrated in 820 of FIG. 8, the user may specify a clause of the new contract by specifying an aspect and a corresponding value of the aspect, as described above. In some embodiments, the user may also specify an enforcement level for the clause, as described herein. This is shown as 830. Again, clauses and enforcement levels may in some embodiments be specified through a GUI. If there are more clauses to be added to the governance contract, shown as the positive exit from 840, the operations illustrated in 820 and 830 may be repeated for the additional clauses, as shown in FIG. 8. If there are no additional clauses to be added, shown as the negative exit from 840, the new contract may be saved for use with various virtual service offerings (e.g., to be associated with various virtual service offerings in a service registry 340), as in 850.

Figure 9:
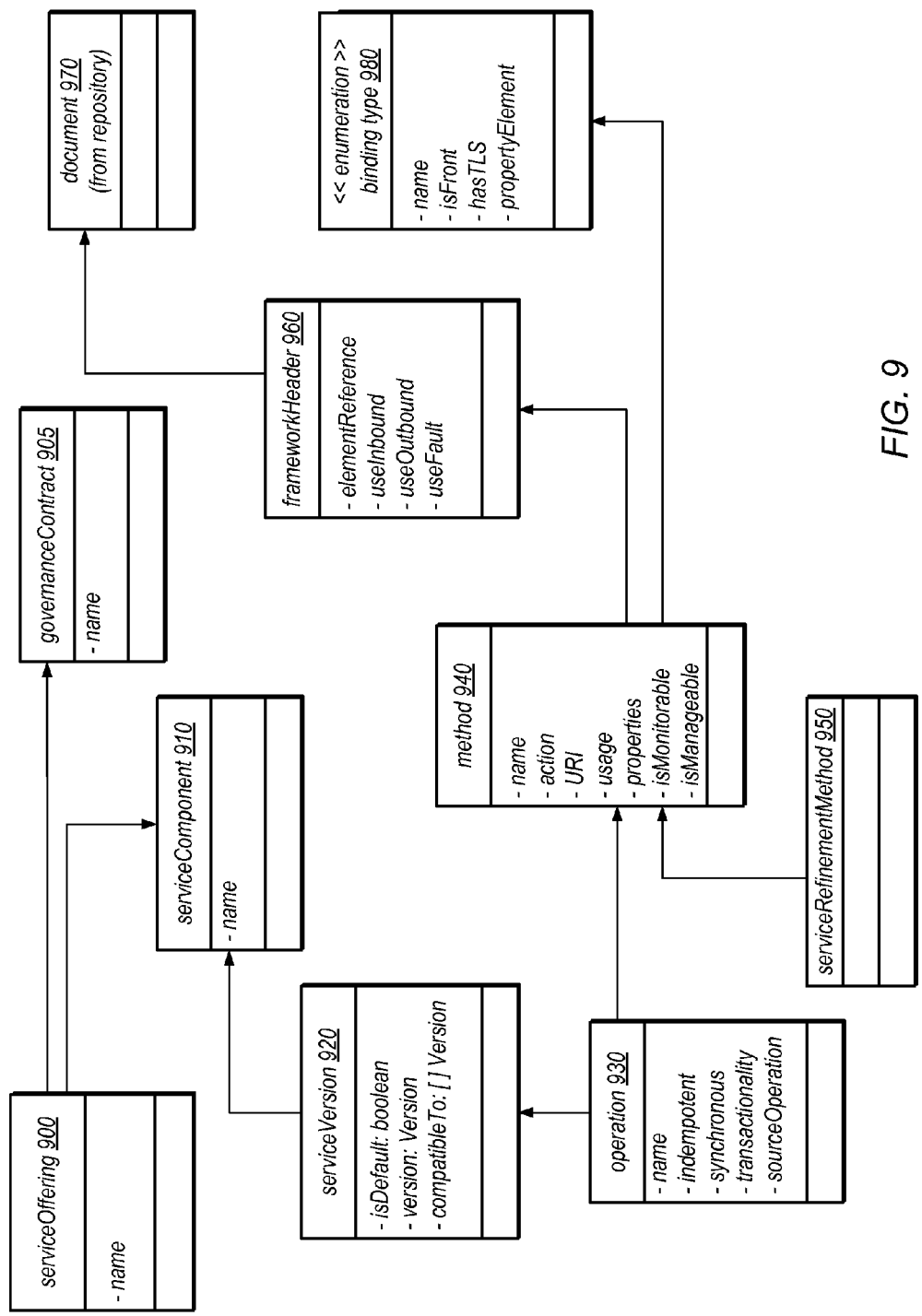
FIG. 9 is a diagram illustrating a portion of an information model in a service governance framework, according to one or more embodiments.

As previously noted, a service governance framework, as described herein, may include an underlying information model that facilitates virtualization on multiple levels. The information model may, in various embodiments, be implemented as a database document, an XML document, or as data stored in any other format suitable for associating components with a virtualized service offering. FIG. 9 illustrates a portion of such a model (e.g., an object model), according to one embodiment, showing how service components and governance contracts together form a virtualized service. In this example, a service offering element 900, which includes at least a name, references a service component 910 and a governance contract 905, which includes at least a name. The governance contract may in turn reference one or more clauses, each mapping an aspect to a value, as described herein (not shown). In this example, service component 910 includes a name, which may be specified through a GUI by a service developer when creating the service component. In this example, the service governance framework may include (e.g., in its registry) multiple versions of service component 910, details of which are specified by an associated service version 920. As illustrated in FIG. 9, service version 920 may include specification of whether a given version of service component 910 is the default version, the version identifier, and identification of one or more versions with which the given version is compatible.

In the example illustrated in FIG. 9, an information model element 930 associated with each version of service component 910 may define each operation of the service component for that version. Each operation 930 may specify an operation name, a source operation for the operation, and various parameter values associated with the operation, some of which are described above. In this example, each operation may be associated with an underlying implementation method 940, specifying a method name, action, URI, usage, and other properties, as described herein. In some embodiments, a service refinement method 950 may be associated with a method 940, and may be invoked to further refine method 940, as described herein.

In the example illustrated in FIG. 9, each method 940 is associated with a framework header 960 and one or more binding types 980. This framework header may denote, for example, that the service implementation and/or corresponding aspect enforcement methods require particular headers to be included in request and/or response messages (e.g., as SOAP headers containing security and/or addressing information). In this example, framework header 960 may in turn be associated with one or more documents 970 of a repository. For example, this field may represent a reference to an XML schema document that describes the syntax for the header, or may represent a reference to any other document stored in the repository and associated with the service component or method thereof, in different embodiments.

Figure 10:
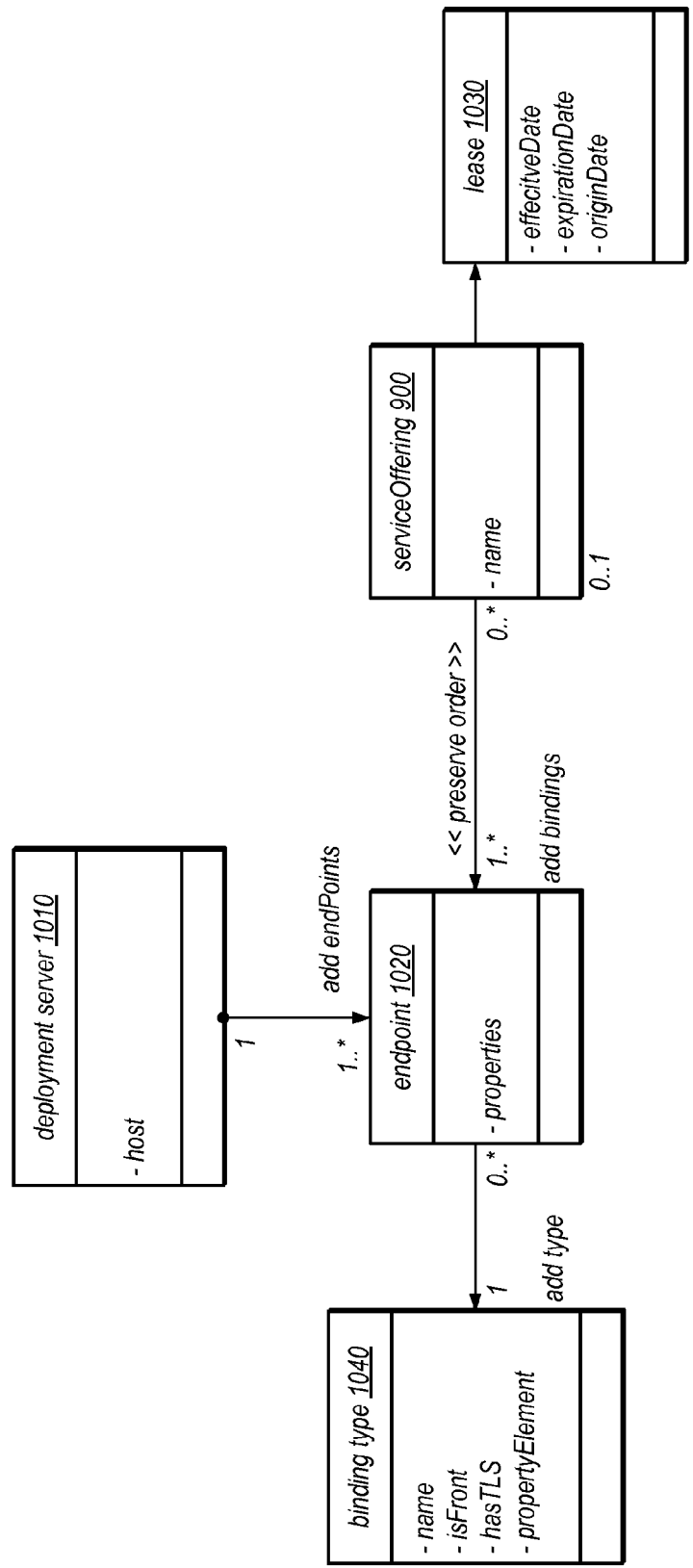
FIG. 10 is a diagram illustrating a portion of an information model in a service governance framework, according to one or more embodiments.

In the service governance framework described herein, virtual services may be addressed as service offerings. FIG. 10 illustrates a portion of an underlying information model (e.g., an object model) of a service governance framework depicting the relationship between a service offering and the endpoints of an intermediate processor (gateway) for a virtual service. In this example, a service offering, (in this case, service offering 900 of FIG. 9), which includes at least a name, is associated with an endpoint 1020 of one such intermediate processor. Endpoint 1020 is, in turn, associated with a service implementation binding type 1040. Service offering 900 is also associated with a lease 1030, which may specify an effective date, an expiration date, and origin date, or other information about the lease, in various embodiments. As discussed above, each service implementation and each service component or operation thereof may be associated with binding types irrespective of the binding types of the others. In this example, deployment server 1010 is associated with a plurality of endpoints 1020 that may be selected for association with a given service offering 900.

Note that in other embodiments, more, fewer, and/or different element may make up an underlying information model for a service governance framework than elements 900-980 and 1010-1040 illustrated in FIGS. 9-10, and these elements may specify more, fewer, and/or different parameters for each service offering and/or component.

As previously noted, the service governance framework described herein may support multiple levels of virtualization. In some embodiments, some or all of the following five levels of virtualization may be defined in the system: endpoint level, binding level, message level, operation level, and service level. The design of each of these virtualization techniques in described in more detail below, according to one embodiment.

Endpoint Level Virtualization

Endpoint virtualization may in some embodiments be achieved by a combination of the following service governance framework features:

1. A WSDL transformation at design time changes the endpoint(s) of the service(s) in the WSDL.
2. At runtime, the transformed endpoint(s) in the WSDL will know the actual endpoint(s) of the service implementation to forward the request for further processing.

For example, when a service is registered in the framework, the metadata of the service may be stored in the framework's repository. This may include storing indicators of service implementation endpoints. This data may be used later to redirect service requests from intermediate endpoints to the actual endpoints during runtime, as described herein. In this example, the pre-recorded intermediate processor (e.g., gateway) endpoints from the endpoint table may be displayed to the governance officer so that they may choose one or more for the virtual service. The selected endpoints may then be integrated into the virtual service WSDL as service endpoints. An example screen shot of a framework GUI that may be used in selecting endpoints is described below with reference to FIG. 19.

Binding Level Virtualization

Binding level virtualization may in some embodiments be achieved by a combination of the following service governance framework features:

1. A WSDL transformation at design time changes the operation binding type in the WSDL, e.g., from SOAP1.2 to SOAP1.2, from SOAP to JMS, from SOAP to HTTP, etc.
2. At runtime, the transformed binding type in the WSDL will be translated to the actual binding type of the service implementation. This may allow the service implementation to process requests having different binding types.

Note that this technique may require an intermediate processor to transform the binding types to actual binding types for service implementations. In other words, it may require a virtual endpoint supporting the transformed binding type, and this endpoint point may later transform the binding type to the actual implementation binding type for processing. Therefore, this technique may be used in conjunction with an endpoint virtualization technique, in some embodiments.

As noted above, the service registration process may store the service implementation metadata in the framework's repository, including service implementation binding details. These details are shown as binding type 980 in FIG. 9. In some embodiments, a service developer may provide or change the binding type information though the framework's GUI, e.g., by editing the operation details on the service component. This is illustrated in FIG. 13 and described below. An intermediate processor (e.g., gateway) may translate the virtual service binding type to the binding type provided for the operation at runtime. For example, a governance officer may select the appropriate binding type while creating the virtual service based on the service consumer consumption scenarios. The actual service binding types in the WSDL may be replaced with the selected binding type on the virtual service. Hence, the WSDL exposed to the consumer will include the virtual binding types. This is illustrated in FIG. 10 as virtual binding type 1040.

Message Level Virtualization

Virtual messages may be defined in different ways, e.g., using a relatively simple approach, or a more complex one. Message level virtualization may in some embodiments be achieved by a combination of the following service governance framework features:

a) To implement a simple approach:
1. A WSDL transformation at design time changes the input and output message structure of the operation(s) in the WSDL by adding additional headers.
2. A corresponding runtime step may be optional depending on how the service is implemented. In some embodiments, the intermediate processor may strip off the additional headers. In other embodiments, if the service implementation requires these headers, they may be carried forward. In still other embodiments, the service may ignore the additional headers, and then may carry them forward by skipping an additional processing step (e.g., stripping headers) at runtime. The framework may allow design time configuration for each of these options, or for others.

b) To implement a more complex approach:
1. A WSDL transformation at design time changes the input and output message structure of the operation(s) in the WSDL by suppressing or adding elements on the message body.
2. This technique may require service refinement logic at runtime. For example, service refinement logic (e.g., a service refinement processor) may be responsible for suppressing any additional elements in the message body, for populating any non-null and/or optional elements with default values in the messages. There may be some limitations in this approach, e.g., any suppressed non-null or optional elements may be required to have the default values defined in the schema definition, in some embodiments. Otherwise, the service implementation may fail to process the refined messages from the service refinement processor.

With message level virtualization, all the required headers for the implementation may be forwarded to the virtual service. The framework may also support the definition (e.g., by the user) of any new or additional headers that may be missing or required by the intermediate processor, and may also allow for the definition of one or more service refinement methods for each operation of the service component. In some embodiments, the service governance framework delivery agent (e.g., a gateway) described herein may require a default header for governing purposes. A required header is illustrated, for example, as frameworkHeader 960 in FIG. 9. In some embodiments, required additional headers and/or service refinement methods may be defined through the framework's GUI, as illustrated in FIG. 13 and described below.

Operation Level Virtualization

Operation level virtualization may in some embodiments be achieved by a combination of the following service governance framework features:

1. A WSDL transformation changes the operation names when:
   a. Users compose operations with the same names from different services into a single virtual service, or
   b. Operation names may be difficult for service consumers to understand (e.g., too technical).
2. At runtime, the transformed operation names in the WSDL will be translated to the actual operation name of the service implementation so that the service implementation can understand the new operation name and process requests.

In some embodiments the framework's repository may capture the actual operation names from the service implementation during the registration process. In such embodiments, these operation names may be used later by the intermediate processor (e.g., gateway) for translation. FIG. 9 illustrates an operation 930 that includes an operation name. In some embodiments, the operation name may be modified (e.g., changed to a more meaningful name, or changed to avoid ambiguity) through the framework's GUI, as illustrated in FIG. 13. In such embodiments, any modified operation names will appear in the WSDLs exposed to the service consumers.

Service Level Virtualization

Service level virtualization may in various embodiments be used in different ways, including a) suppressing irrelevant operations of a service, and b) composing operations from different services. Service level virtualization may in some embodiments be achieved by a combination of the following service governance framework features:

a) To suppress irrelevant operation on the service:
1. A WSDL transformation removes irrelevant operation definitions from the WSDL, e.g., operations that should not be exposed to consumers, or operations that consumers may not be interested in.
2. For this technique, no additional processing may be required at runtime.

b) To compose operations from different services:
1. A WSDL transformation may add operations definition from different services when:
   a. A set of logically-related operations is scattered across a number of disparate services, or
   b. A service developer wishes to consolidate operations from different services and offer them to consumers as a single service, instead of exposing all the services for all of the operations.
2. For this technique, no additional processing may be required at runtime.

The service registration process (e.g., through the framework's console) may in some embodiments involve a two step process:

Step 1: Define the service name, service version, and default version

Step 2: Add one or more operations from any of the existing services.

This clear separation may provide the service developer with the means to apply or use the two forms of service virtualization described above. After step 2, the transformed WSDL may include only the operations selected during the registration process, in this example.

As previously noted, a service governance framework may include a console through which users may interact with the framework to develop, configure, and/or activate virtual services. FIGS. 11-21 illustrate various actions that may be initiated through a service governance framework console (e.g., a GUI) by service developers, business analysts, and/or governance officers, including some of those described above. FIG. 11, for example, depicts a representation of a screen shot of a service governance framework administration console during creation of a new service component, according to one embodiment. In this example, the name of the new service component, "Shipping Rate Calculator," and a version number (1.0.0.0) are specified in fields 1101 and 1102, respectively, by a user acting in the role of SOA developer, and this version is designated as the default version by the user, shown as selection 1103. As illustrated in FIG. 11, no operations are included in the operations list 1104 for this service component yet. The service component developer may add an operation by selecting the "new" field of operations list 1104.

FIG. 12 depicts a representation of a screen shot of the service governance framework administration console when adding one or more operations to the new service component, according to one embodiment. This interface may be used to select operations when suppressing irrelevant operations of a service, or when selecting operations from multiple services, as described above. In this example, a source for the operations (in this case, a WSDL URL) is selected in source selection window 1201, and the URL is specified by the user in field 1202. The "Get Operations" option of WSDL URL selection field 1202 initiates the display of various operations available through the selected source. These are displayed in operations list 1203. In this example, the user has selected the "GetShipRate" operation, and various parameters of the operation are displayed.

The following example code represents a portion of a WSDL for the selected GetShipRate operation, before transformation:

```
<message name="GetShipRateRequest">
    <part name="part1" element="ns:GetShipRateReqElem"></part>
</message>
<message name="GetShipRateResponse">
    <part name="part1" element="ns:GetShipRateRespElem"></part>
</message>
<portType name="Shipco_ServiceSoap">
    <operation name="GetShipRate">
        <input name="input3" message="tns:GetShipRateRequest"></input>
        <output name="output3" message="tns:GetShipRateResponse">
        </output>
    </operation>
</portType>
<binding name="Shipco_ServiceBinding" type=
"tns:Shipco_ServiceSoap">
    <soap:binding style="document"
    transport="(protocol)//schemas.xmlsoap.org/soap/http">
    </soap:binding>
    <operation name="GetShipRate">
        <soap:operation></soap:operation>
        <input name="input3">
            <soap:body use="literal"></soap:body>
        </input>
        <output name="output3">
            <soap:body use="literal"></soap:body>
        </output>
    </operation>
</binding>
```

The following example code represents a portion of the WSDL for the GetShipRate operation, after begin transformed, as described herein:

```
<wsdl:message name="GetShipRateRequest">
    <wsdl:part name="part1" element="mns0:GetShipRateReqElem">
    </wsdl:part>
</wsdl:message>
<wsdl:message name="GetShipRateResponse">
    <wsdl:part name="part1" element="mns0:GetShipRateRespElem">
    </wsdl:part>
</wsdl:message>
<wsdl:portType name="Shipco_ServiceSoap">
    <wsdl:operation name="GetShipRate">
        <wsdl:input name="input3" message=
        "framework:GetShipRateRequest">
        </wsdl:input>
        <wsdl:output name="output3"
            message="framework:GetShipRateResponse">
        </wsdl:output>
    </wsdl:operation>
<wsdl:binding name="Shipco_ServiceSoapBinding"
        type="framework:Shipco_ServiceSoap">
<mns1:binding style="document"
    transport="(protocol)://schemas.xmlsoap.org/soap/http"/>
<wsdl:operation name="GetShipRate">
    <mns1:operation
    soapAction="offeringID=1110:OperationName=GetShipRate"/>
    <wsdl:input name="input3">
        <mns1:body use="literal"/>
        <mns1:header message="framework:ServiceHeader"
        part="ServiceRequest" use="literal"></mns1:header>
    </wsdl:input>
    <wsdl:output name="output3">
        <mns1:body use="literal"/>
    </wsdl:output>
</wsdl:operation>
</wsdl:binding>
```

FIG. 13 depicts a representation of a screen shot of the service governance framework administration console during editing of a service component operation, according to one embodiment. In this example, the user (e.g., the service developer) may specify a name for the operation in field 1301, an undo operation in field 1305, a method name in field 1306, an action to take in field 1307, a URI for the operation implementation in field 1308, and a binding type in field 1311. As illustrated in FIG. 13, the user may also indicate whether the operation is idempotent (in field 1302), synchronous (in field 1303), transactionable (in field 1304), monitorable (in field 1309) and/or manageable (in field 1311). In this example, properties associated with the operation, if any, may be displayed in properties list 1312, or new properties may be added and associated with the operation. In addition, any required headers may be displayed in required headers list 1313 for this operation, and/or such headers may be added by selecting the "new" element of required headers list 1312. In the example illustrated in FIG. 13, no properties or required headers are currently associated with the operation.

In the example code above, the following portion may represent a WSDL transformation that involved adding a required header:

```
<mns1:header message="framework:ServiceHeader"
part="ServiceRequest" use="literal"></mns1:header>
```

In the example code above, if the name of the operation had been changed by the user (e.g., by entering a different name in field 1301 of the console GUI depicted in FIG. 13), the resulting code may have included the following line in the operation definition section and in the binding section, rather than the one listed above:

<wsdl:operation name="Get My Shipping Rate">

Similarly, the code resulting from the transformation may have included this line in the binding section, rather than one that referenced the original operation name (not shown).

FIG. 14 depicts a representation of a screen shot of the service governance framework administration console subsequent to performing the actions described above and illustrated in FIGS. 11-13. In this example, the user has selected the new service component by specifying its name in field 1401 and its version number in field 1402. Field 1403 indicates that this version of the service component is the default version. As shown in FIG. 14, at this point, operations list 1404 of the new service component includes only the "GetShipRate" operation, which was added as described above.

As described above, operations from different sources may be associated with a single virtual service component. FIG. 15 depicts a representation of a screen shot of the service governance framework administration while adding an operation from a different source to the service component created by the previous actions, according to one embodiment. In this example, a source for the operations (in this case, a WSDL URL) is selected in source selection window 1501. The URL for the new source (i.e., a different URL than that specified by the previous "add operation" action) is specified by the user in field 1502. The "Get Operations" option of WSDL URL selection field 1502 initiates the display of various operations available through the selected source. These are displayed in operations list 1503. In this example, the user has selected the "GetUserInfo" operation and the "ListUsers" operation for inclusion in the new service component. Various parameters of these operations are displayed in operations list 1503. These operations may be configured for use in the service component in a manner similar to that described above for the "GetShipRate" operation, such as through an "edit operation" action (not shown).

FIG. 16 depicts a representation of a screen shot of the service governance framework administration console subsequent to adding additional operations to the new service component, according to one embodiment. In this example, the user has selected the new service component by specifying its name in field 1601 and its version number in field 1602. Field 1603 indicates that this version of the service component is the default version. As shown in FIG. 16, at this point, operations list 1604 of the new service component includes the "GetShipRate" operation, along with the "GetUserInfo" and "ListUsers" operations, which were added as described above.

Figure 17:
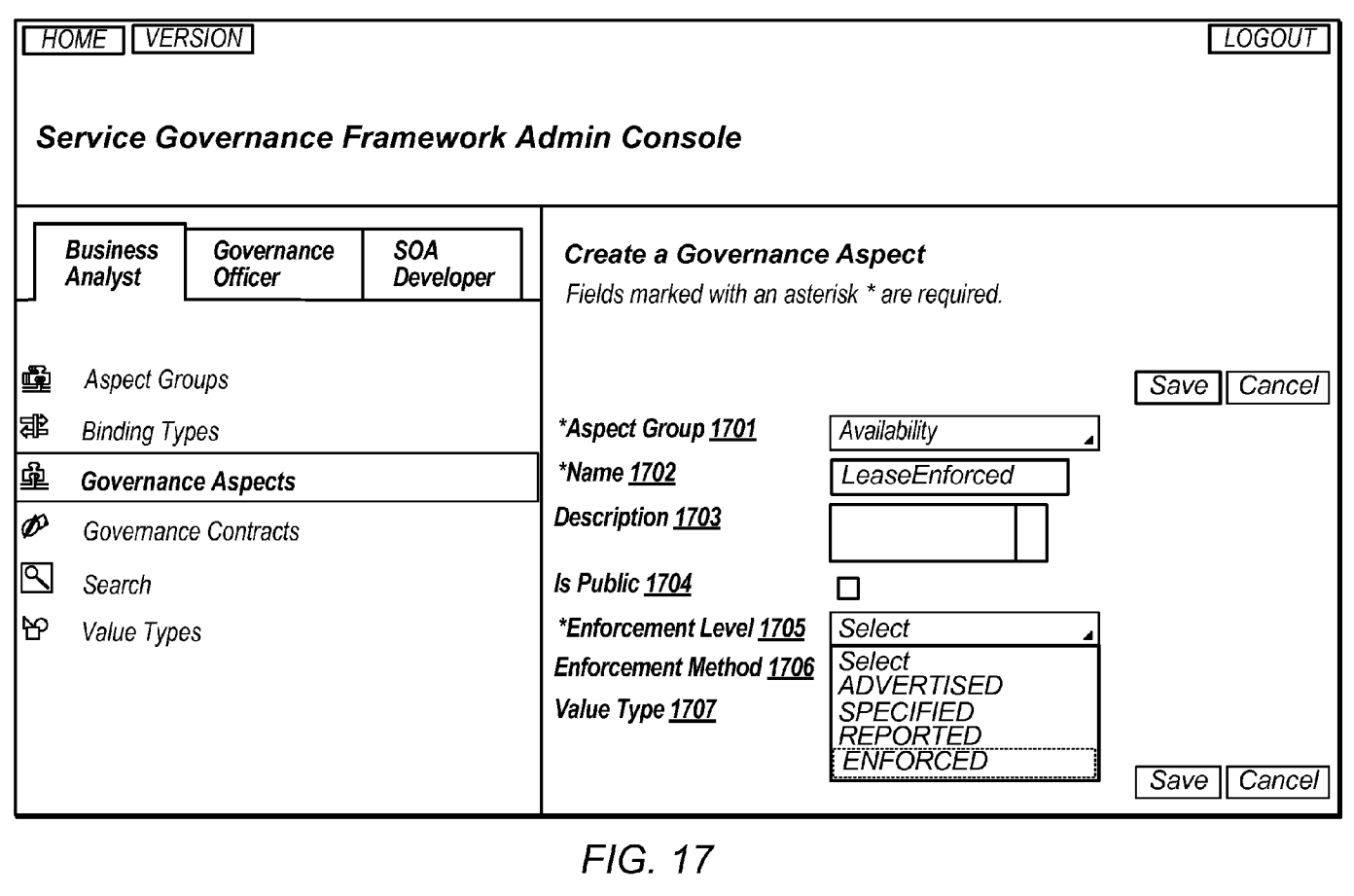

As previously described, a user (e.g., a business analyst or governance officer) may create a governance contract to be applied to one or more virtual service components in a virtual service offering. FIG. 17 depicts a representation of a screen shot of the service governance framework administration console during the creation of a governance aspect for such as contract, according to one embodiment. In this example, the user, acting in the role of business analyst, may specify an aspect group for the governance aspect in field 1701. The user may specify the name of the aspect in 1702, and may also enter a description of the aspect in field 1703. In this example, the name of the new governance aspect is "LeaseEnforced." As discussed above, the user may select an enforcement level in field 1705. FIG. 17 depicts the selection of the enforcement level "ENFORCED," for example. The user may also specify an aspect enforcement method to be invoked in 1706. Other parameters of the new governance aspect that may be configured by the user include whether it is public (in 1704) and the value type (in 1707). For example, the value of an aspect may have a numeric type, a string type, or another type, in various embodiments.

The governance aspect created as described above may be included in one or more governance contracts, as described herein. FIG. 18 depicts a representation of a screen shot of the service governance framework administration console during the creation of a governance contract, according to one embodiment. In this example, the user (e.g., a business analyst) may specify the name of the new governance contract in field 1801. In this example, the contract name is the same as the name of the new governance aspect, "LeaseEnforced," although contract names and aspect names need not be the same in other embodiments. Clause list 1802 displays various clauses of the contract, e.g., clauses that have already been configured and/or aspects that are available for selection and/or configuration as clauses. In this example, selecting "LeaseEnforced" in clause list 1802 and entering a value for this aspect in clause list 1802 would define a clause for this governance contract.

Creating and configuring a service component, as illustrated in FIGS. 11-18 and described above, does not necessarily make the service component available to service consumers. In some embodiments, a service offering may be created, published, and then activated before service consumers may invoke it. FIG. 19 depicts a representation of a screen shot of the service governance framework administration console during creation of a service offering, according to one embodiment. In this example, a user acting in the role of governance officer may create a service offering. The user may specify a name for the new service offering in field 1901 (e.g., "Shipping_with_Lease.") In some embodiments, such as that illustrated in FIG. 19, a default lease period may be displayed, which may be extended by selection of field 1902. In other embodiments, the user may specify a lease period at the time the service offering is created (not shown). In this example, the user may select the service components to be made available through the service offering (in field 1903) and/or may specify a governance contract to be applied to the service offering (in field 1904). The console may display an endpoint list 1905, from which one of one or more endpoints may be selected, and/or an attribute list 1906, through which attributes may be displayed, added, or deleted for the service offering. In some embodiments, a screen available through the GUI may allow a deployment server to be specified and/or added and a binding type to be specified, along with various properties, such as a protocol (e.g., HTTP), port number, context (e.g., framework configuration and/or version), etc. (not shown). The example code below may represent a portion of a WSDL before transformation to reflect such selections.

```
<service name="Shipco_Service">
    <port name="Shipco_ServicePort" binding=
    "tns:ShipcoSOAPBinding">
        <soap:address location=
        "(protocol)://shipco.com/Shipco_service_manager/port1/">
        </port>
</service>
```

The example code below may represent a portion of the corresponding WSDL after transformation, as described herein.

```
<wsdl:service name="Shipping Rate Calculator">
    <wsdl:port name="Shipco_ServiceSoapBinding0" binding=
    "framework:
        Shipco_ServiceSoapBinding ">
        <mns1:address location=
        " (protocol)://localhost:8080/frameworkv2/ABCDE "/>
    </wsdl:port>
</wsdl:service>
```

In some embodiments, the extensible binding type element in the WSDL may be proprietary, and there may be no standard bindings other than SOAP and HTTP. In such embodiments, commonly used binding types may be defined within the service governance framework and they may be assigned through a console GUI, as described herein.

Once a service offering is created, the user (e.g., the governance officer) may publish (or re-publish) the service offering to make it available to service consumers. FIG. 20 depicts a representation of a screen shot of the service governance framework administration console during publishing of a service offering, according to one embodiment. In this example, the user has selected the new service offering "Shipping_with_Lease" from service offering list 2001 to be published. FIG. 21 depicts a representation of a screen shot of the service governance framework administration console during activation of the service offering, according to one embodiment. In this example, the user has selected "ACTIVE" from the pull-down menu associated with the new service offering "Shipping_with_Lease" in Manageable Resources list 2101. Selecting "ACTIVE" in this field may initiate activation of the service offering so that invocation of an operation of the service offering, (e.g., "GetShipRate," "GetUserInfo," or "ListUsers") will invoke the implementation methods and aspect enforcement methods associated with the operations through the configuration operations described above.

Figure 22:
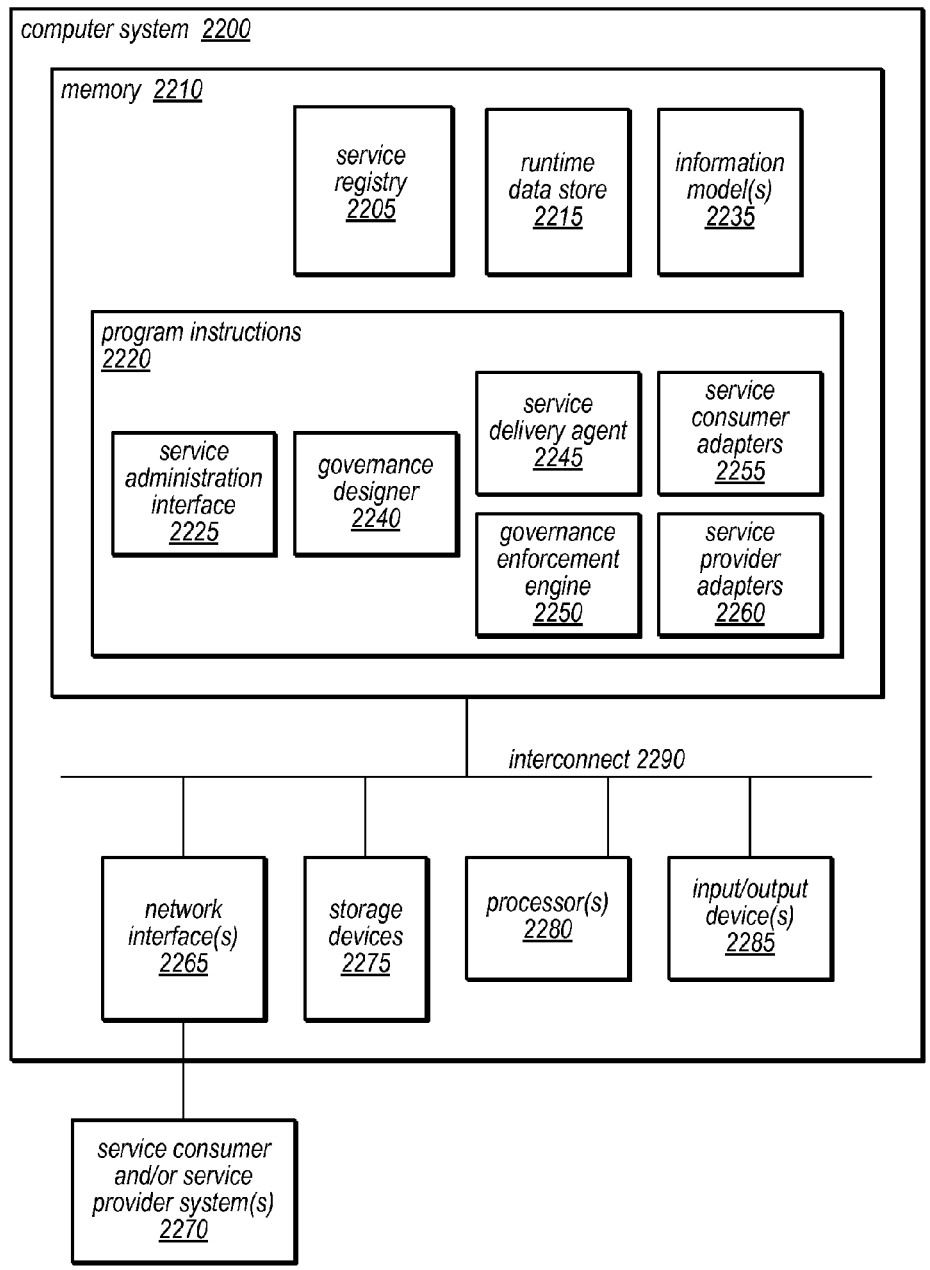
FIG. 22 is a block diagram illustrating an exemplary computer system suitable for implementing a service governance framework, according to one or more embodiments.

The system and methods described herein may be suitable for application to any of various computing systems. FIG. 22 illustrates a computing system 2200 capable of implementing the service governance framework described herein and/or any of various service consumer systems or service provider systems 2270, according to various embodiments. For example, in one embodiment, a service governance framework may be implemented on one or more nodes illustrated as computer system 2200, and a service consumer system 2270 may be implemented on a computer system having components similar to those of computer system 2200 (e.g., memory 2210, network interfaces 2265, storage devices 2275, processors 2280 and input/output devices 2285) and may be configured to communicate with computer system 2200 (e.g., to exchange service request messages and/or responses) through network interfaces 2265. In another embodiment, one or more service provider systems may be implemented on a computer system having components similar to those of computer system 2200, and may be configured to communicate with computer system 2200 (e.g., to exchange service request messages and/or responses) through network interfaces 2265. In other embodiments, service consumer and/or provider systems 2270 may comprise computer systems having more, fewer, or different components than those illustrated in FIG. 22.

Each of computer system 2200 and any service consumer and/or service provider systems 2270 may provide various components of a service governance framework and/or an SOA environment, as described herein. Computer system 2200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. Note that in some embodiments, a service governance framework implementation may be distributed across two or more nodes, and each node may comprise a computer system identical or similar to that illustrated in FIG. 22. In other embodiments, two or more nodes of a distributed service governance framework may comprise computer systems having more, fewer, or different components than those illustrated in FIG. 22. Note that in order to support SDLC-awareness, as described herein, computer system 2200 may be replicated for each life cycle phase or state and its corresponding environment (e.g., for development, user acceptance testing (UAT), system testing, production, and sustaining).

The service governance framework described herein may be provided as a computer program product, or software, that may include a computer-readable storage medium having stored thereon program instructions, which may be used to program a computer system such as computer system 2200 (or another electronic device) to perform a process according to the methods described herein. A computer-readable storage medium may include any mechanism for storing information in a form (e.g., software, processing application) readable by a machine (e.g., a computer) and executable by the machine to implement the methods described herein. A machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of media suitable for storing program instructions. In addition, program instructions may be communicated to computer system 2200 using optical, acoustical or other form of propagated signal (e.g., carrier waves, infrared signals, digital signals, etc.) in order to program the computer system to perform the processes described herein.

A computer system 2200 may include a processor unit 2280 (possibly including multiple processors, a single-threaded processor, a multi-threaded processor, a multi-core processor, etc.). The computer system 2200 may also include one or more system memories 2210 (e.g., one or more of cache, SRAM, DRAM, RDRAM, EDO RAM, DDR RAM, SDRAM, Rambus RAM, EEPROM, etc.), a system interconnect 2290 (e.g., LDT, PCI, ISA, etc.), one or more network interface(s) 2265 (e.g., an ATM interface, an Ethernet interface, a Frame Relay interface, etc.), and one or more storage device(s) 2275 (e.g., optical storage, magnetic storage, etc.). Memory 2210 and/or storage devices 2275 may include a computer-readable storage medium, as described above, and may include other types of memory as well, or combinations thereof. Note that in some embodiments, network interface(s) 2290 may include hardware and/or software support for implementing internal and/or external interconnect resources (e.g., NAT, load balancing, VPN, WebDAV, etc.). In the example illustrated in FIG. 22, computer system 2200 may include one or more input/output devices, such as a monitor or other display device through which users may interact with the service governance framework (e.g., through a GUI). Other embodiments may include fewer components or additional components not illustrated in FIG. 22 (e.g., video cards, audio cards, additional network interfaces, peripheral devices, etc.). The processor unit(s) 2280, the storage device(s) 2275, the network interface 2265, the input/output devices 2285, and the system memory 2210 may be coupled to the system interconnect 2290.

One or more of the system memories 2210 may embody one or more service registries 2205, information models 2235, and/or runtime data stores 2215, as described herein. As described above, in some embodiments information models 2235 may be stored in service registry 2205, along with components associated with various virtual service offerings, while in other embodiments, these components may be stored in a separate repository in memory 2210. Note that in some embodiments, a service registry 2205, information model 2235, and/or a runtime data store 2215 may be included in one or more of storage devices 2275 or in another memory accessible by computer system 2200, instead of, or in addition to, being included in system memory 2210. Note also that various elements illustrated in FIG. 22 as residing in memory 2210 may in some embodiments be implemented in different memory spaces (e.g., a shared memory space and one or more local memory spaces) within a single physical memory or as different memory spaces distributed across any number of physical memories devices (e.g., in one or more storage devices 2275 and/or storage devices of a computing system other than computer system 2200), in different embodiments.

In some embodiments, memory 2210 may include program instructions 2220 computer-executable to implement all or a portion of a service governance framework, as described herein. For example, program instructions 2220 may be executable to implement a service administration interface 2225, which may include support for an service governance framework administration console 123; various service consumer adapters 2255, and service provider adapters 2260, which may translate messages between service consumers and providers according to different protocols and/or transport mechanisms; a governance designer 2240; a service delivery agent 2245; and/or a governance enforcement engine 2250, which may include program instructions executable to implement a variety of aspect enforcement methods (not shown). In embodiments in which computer system 2200 represents a service provider system 2270, program instructions 2220 may be executable to implement one or more service implementation methods, which may be invoked on behalf of service consumers by the service governance framework. Similarly, in embodiments in which computer system 2200 represents a service consumer system 2270, program instructions 2220 may be executable to call an operation of a virtual service offering provided through the service governance framework, as described herein.

Note that service administration interface 2225, service consumer adapters 2255, service provider adapters 2260, governance designer 2240, service delivery agent 2245, and governance enforcement engine 2250 may each be implemented in any of various programming languages or methods. For example, in one embodiment, governance enforcement engine 2250 and service delivery agent 2245 may be Java™ based, while in other embodiments, they may be written using the C or C++ programming languages. Similarly, service administration interface 2225 and governance designer 2230 may be implemented in Java™, C, or C++, among other programming languages, according to various embodiments. Moreover, in some embodiments, service administration interface 2225, service consumer adapters 2255, service provider adapters 2260, governance designer 2240, service delivery agent 2245, and governance enforcement engine 2250 may not be implemented using the same programming language. For example, governance enforcement engine 2250 may be C++ based, while other components may be developed using C or Java™. Note that program instructions 2220 may in some embodiments include instructions configured to implement other functionality not shown, such as a compiler, debugger, operating system, or other standard and/or custom software components of a computing system.

While a service governance framework has been described herein with reference to various embodiments, it will be understood that these embodiments are illustrative and that the scope is not limited to them. Although the embodiments above have been described in detail, numerous variations and modifications will become apparent once the above disclosure is fully appreciated. Many variations, modifications, additions, and improvements are possible. More generally, the service governance framework is described in the context of particular embodiments. For example, the blocks and logic units identified in the description are for understanding the described invention and not meant to be limiting. Functionality may be separated or combined in blocks differently in various realizations or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow. It is intended that the following claims be interpreted to embrace all such variations and modifications.

What is claimed is:

1. A computer-implemented method, comprising:
 receiving, by a computing platform comprising one or more computers, input specifying one or more operations of a service provided by a computing services source that is distinct from the computing platform to be included in a virtual service offering, wherein the one or more operations are specified from among a plurality of operations of the service;
 receiving, by the computing platform, input specifying selection of one or more configuration parameter values for at least one of the one or more operations specified for inclusion in the virtual service offering;

producing, by the computing platform, a virtual service interface for the virtual service offering, wherein the producing comprises producing an interface to each of the one or more operations, and wherein the producing is dependent on the one or more configuration parameter values;

exposing, by the computing platform, the virtual service interface to service consumers or activating the virtual service offering;

receiving, by the computing platform and from a service consumer, in accordance with the virtual service interface, a request to perform a particular one of the one or more operations;

executing, by the computing platform, the particular one of the one or more operations on behalf of the service consumer, wherein behavior of the particular one of the one or more operations during the executing is dependent on the one or more configuration parameter values; and returning, by the computing platform, results of the particular one of the one or more operations to the service consumer.

2. The method of claim 1, wherein at least one of the one or more selected configuration parameter values comprises a default configuration parameter value or a value specified through a graphical user interface of the computing platform.

3. The method of claim 1, wherein the producing is further dependent on values of one or more non-functional aspects associated with the virtual service offering.

4. The method of claim 3, wherein the values of the one or more non-functional aspects are specified in a contract associated with the virtual service offering.

5. The method of claim 3, wherein the values of the one or more non-functional aspects define one or more of: a security feature, a privacy feature, a censorship feature, a throttling feature, a monitoring feature, a reporting feature, a lease enforcement feature, a service chargeback feature, a version enforcement feature, a message routing feature, or a message translation feature.

6. The method of claim 3, further comprising:
executing an aspect enforcement method to enforce one of the one or more non-functional aspects;
wherein the executing is performed by the computing platform or by a computing system of the service consumer external to the computing platform, dependent on a governance delegation level associated with the virtual service offering.

7. The method of claim 1, further comprising:
receiving, by the computing platform, input specifying one or more operations of a second service provided by a computing services source to be included in the virtual service offering;
wherein the producing further comprises producing an interface to each of the one or more operations of the second service.

8. The method of claim 1, wherein the one or more operations is fewer than all of the plurality of operations of the service.

9. The method of claim 1, wherein the one or more configuration parameter values specify one or more of: an operation name, a method name, an action, a computing services source, a monitorable property, a manageable property, a binding type, an endpoint, a version identifier, or an undo operation.

10. The method of claim 1, further comprising:
prior to performing the exposing or the activating, receiving, by the computing platform, input initiating exposure of the virtual service interface to service consumers or activation of the virtual service offering;
wherein performing the exposing or the activating is dependent on a life cycle state of the virtual service offering.

11. The method of claim 1, wherein the producing comprises modifying an interface of at least one of the one or more operations provided by the computing services source.

12. The method of claim 1,
wherein the input specifying one or more operations and the input specifying selection of one or more configuration parameter values are received from a user; and
wherein authorization to specify the one or more operations and authorization to specify the selection of one or more configuration parameter values are dependent on a role of the user.

13. The method of claim 1, wherein dependent on the selection of the one or more configuration parameter values, the service offering is virtualized at one or more of: an endpoint level, a binding level, a message level, or an operation level.

14. The method of claim 1, further comprising:
storing, by the computing platform in an underlying information model, data associating with the virtual service offering one or more of: metadata associated with the one or more operations provided by the computing services source, a service implementation of the one or more operations, the one or more configuration parameter values, or a contract associated with the virtual service offering specifying one or more non-functional aspects of the virtual service offering.

15. A non-transitory, computer-readable storage medium storing program instructions that when executed on one or more computers cause the one or more computers to perform:
receiving input specifying one or more operations of a service provided by a remote computing services source to be included in a virtual service offering, wherein the one or more operations are specified from among a plurality of operations of the service;
receiving input specifying selection of one or more configuration parameter values for at least one of the one or more operations specified for inclusion in the virtual service offering, wherein the one or more configuration parameter values specify one or more of: an operation name, a method name, an action, a computing services source, a monitorable property, a manageable property, a binding type, an endpoint, a version identifier, or an undo operation;
producing a virtual service interface for the virtual service offering, wherein the producing comprises producing an interface to each of the one or more operations, and wherein the producing comprises modifying an interface of at least one of the one or more operations provided by the computing services source dependent on the one or more configuration parameter values;
exposing the virtual service interface to service consumers or activating the virtual service offering;
receiving, through the virtual service interface, a request from a service consumer to perform a particular one of the one or more operations;
executing the particular one of the one or more operations on behalf of the service consumer, wherein behavior of the particular one of the one or more operations during the executing is dependent on the one or more configuration parameter values; and returning results of the particular one of the one or more operations to the service consumer.

16. The storage medium of claim 15, wherein the producing is further dependent on values of one or more non-functional aspects specified in a contract associated with the virtual service offering, wherein the values of the one or more non-functional aspects define one or more of: a security feature, a privacy feature, a censorship feature, a throttling feature, a monitoring feature, a reporting feature, a lease enforcement feature, a service chargeback feature, a version enforcement feature, a message routing feature, or a message translation feature.

17. The storage medium of claim 15, wherein the program instructions are further computer-executable to implement:

receiving input specifying one or more operations of a second service provided by a computing services source to be included in the virtual service offering;

wherein the producing further comprises producing an interface to each of the one or more operations of the second service.

18. A system, comprising:

one or more processors; and a memory coupled to the one or more processors and storing program instructions that when executed by the one or more processors cause the one or more processors to perform:

receiving input specifying one or more operations of a service provided by a computing services source that is distinct from the system to be included in a virtual service offering, wherein the one or more operations are specified from among a plurality of operations of the service;

receiving input specifying selection of one or more configuration parameter values for at least one of the one or more operations specified for inclusion in the virtual service offering;

dependent on the selection of the one or more configuration parameter values, virtualizing the service offering at one or more of: an endpoint level, a binding level, a message level, or an operation level;

producing a virtual service interface for the virtual service offering, wherein the producing comprises producing an interface to each of the one or more operations, and wherein the producing comprises modifying an interface of at least one of the one or more operations provided by the computing services source dependent on the one or more configuration parameter values;

receiving, through the virtual service interface, a request from a service consumer to perform a particular one of the one or more operations;

executing the particular one of the one or more operations on behalf of the service consumer, wherein behavior of the particular one of the one or more operations during the executing is dependent on the one or more configuration parameter values; and returning results of the particular one of the one or more operations to the service consumer.

19. The system of claim 18, wherein the producing is further dependent on values of one or more non-functional aspects specified in a contract associated with the virtual service offering, wherein the values of the one or more non-functional aspects define one or more of: a security feature, a privacy feature, a censorship feature, a throttling feature, a monitoring feature, a reporting feature, a lease enforcement feature, a service chargeback feature, a version enforcement feature, a message routing feature, or a message translation feature.

20. The system of claim 18, wherein the program instructions are further executable by the one or more processors to implement:

receiving input specifying one or more operations of a second service provided by a computing services source to be included in the virtual service offering;

wherein the producing further comprises producing an interface to each of the one or more operations of the second service.

* * * * *

UNITED STATES PATENT AND TRADEMARK OFFICE
CERTIFICATE OF CORRECTION

PATENT NO. : 8,886,571 B2  
APPLICATION NO. : 12/194393  
DATED : November 11, 2014  
INVENTOR(S) : Mannava et al.

Page 1 of 1

It is certified that error appears in the above-identified patent and that said Letters Patent is hereby corrected as shown below:

In The Drawings

On sheet 8 of 22, in figure 8, line 2, delete "variousvirtual" and insert -- various virtual --, therefor.

In The Specification

In column 6, line 27, delete "WSLD" and insert -- WSDL --, therefor.

In column 8, line 66, delete "updateMaillingAddress," and insert -- updateMailingAddress, --, therefor.

In column 9, line 3, delete "updateMaillingAddress," and insert -- updateMailingAddress, --, therefor.

In column 9, line 7, delete "updateMaillingAddress," and insert -- updateMailingAddress, --, therefor.

In column 9, line 34, delete "getProdbyCat," and insert -- getProdByCat, --, therefor.

In column 9, line 40, delete "getProdbyCat" and insert -- getProdByCat --, therefor.

In column 27, line 17, delete "SOAP1.2 to SOAP1.2," and insert -- SOAP 1.1 to SOAP 1.2 --, therefor.

Signed and Sealed this  
Twenty-third Day of June, 2015

Michelle K. Lee  
*Director of the United States Patent and Trademark Office*